United States Patent
Hirokawa

(10) Patent No.: US 11,283,958 B2
(45) Date of Patent: Mar. 22, 2022

(54) IMAGE FORMING APPARATUS, INFORMATION PROCESSING METHOD, AND NON-TRANSITORY COMPUTER-READABLE MEDIUM CONFIGURED TO DETERMINE A PROCESS TO PERFORM TO A SET VALUE, ENCRYPT AND STORE A SET VALUE IN A FIRST MEMORY AREA, WRITE OR READ A SET VALUE IN A SECOND MEMORY AREA

(71) Applicant: Tatsuma Hirokawa, Kanagawa (JP)

(72) Inventor: Tatsuma Hirokawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/782,658

(22) Filed: Feb. 5, 2020

(65) Prior Publication Data

US 2020/0267264 A1    Aug. 20, 2020

(30) Foreign Application Priority Data

Feb. 15, 2019    (JP) .............................. JP2019-026085

(51) Int. Cl.
*H04N 1/00*     (2006.01)
*G06F 12/14*    (2006.01)
*G06F 3/12*     (2006.01)

(52) U.S. Cl.
CPC ....... *H04N 1/0097* (2013.01); *G06F 12/1408* (2013.01); *H04N 1/00938* (2013.01);
(Continued)

(58) Field of Classification Search
CPC ............. H04N 1/4486; H04N 1/32272; H04N 1/0097; H04N 1/00938; H04N 1/2129;
(Continued)

(56) References Cited

U.S. PATENT DOCUMENTS 10,185,523 B2 *  1/2019  Kawakami ......... H04N 1/00464
2002/0184495 A1 * 12/2002  Torii ..................... G06F 21/608
                                                         713/160
(Continued)

FOREIGN PATENT DOCUMENTS

CN      102045479 A      5/2011
CN      104683639 A      6/2015
(Continued)

OTHER PUBLICATIONS

Extended European Search Report dated May 15, 2020 issued in corresponding European Application No. 20155787.3.
(Continued)

*Primary Examiner* — Chad Dickerson
(74) *Attorney, Agent, or Firm* — Harness, Dickey & Pierce, P.L.C.

(57) ABSTRACT

An image forming apparatus includes an operation device coupled to the image forming apparatus and configured to accept an operation to the image forming apparatus. The image forming apparatus includes a memory including a first memory area configured to store a set value to be used by the image forming apparatus or the operation device. The image forming apparatus further includes circuitry configured to: accept an operation of writing or reading the set value; determine a type of a process to be performed on the set value; and perform the process in accordance with a determination result by the circuitry, to encrypt the set value and store the encrypted set value in the first memory area of the memory, write the set value to a second memory area in the memory, or read the set value from the second memory area.

12 Claims, 23 Drawing Sheets

(52) U.S. Cl.
CPC ............... *G06F 2212/1052* (2013.01); *H04N 2201/0094* (2013.01)

(58) Field of Classification Search
CPC ... H04N 2201/0094; H04N 2201/3281; H04N 2201/1052; G06F 12/1408; G06F 21/602; G06F 2212/1052
USPC ................................ 358/1.11–1.18; 713/182
See application file for complete search history.

(56) References Cited

U.S. PATENT DOCUMENTS

| | | | |
|---|---|---|---|
| 2007/0087778 A1 | 4/2007 | Otsuka | |
| 2013/0016399 A1* | 1/2013 | Kobayashi | G06F 3/1231 358/1.16 |
| 2016/0378997 A1* | 12/2016 | Shim | G06F 21/6245 713/190 |
| 2017/0242572 A1* | 8/2017 | Inoue | G06F 9/44526 |
| 2018/0129538 A1* | 5/2018 | Okuno | G03G 15/502 |

FOREIGN PATENT DOCUMENTS

| | | | |
|---|---|---|---|
| CN | 106687912 A | | 5/2017 |
| JP | 2011-035670 A | | 2/2011 |
| JP | 2011035670 A | * | 2/2011 |
| JP | 2016-131323 A | | 7/2016 |
| JP | 2016131323 A | * | 7/2016 |
| JP | 2017-144649 | | 8/2017 |
| JP | 2019-160226 | | 9/2019 |

OTHER PUBLICATIONS

Office Action dated Oct. 8, 2021 in Chinese Application No. CN202010091840.9.

* cited by examiner

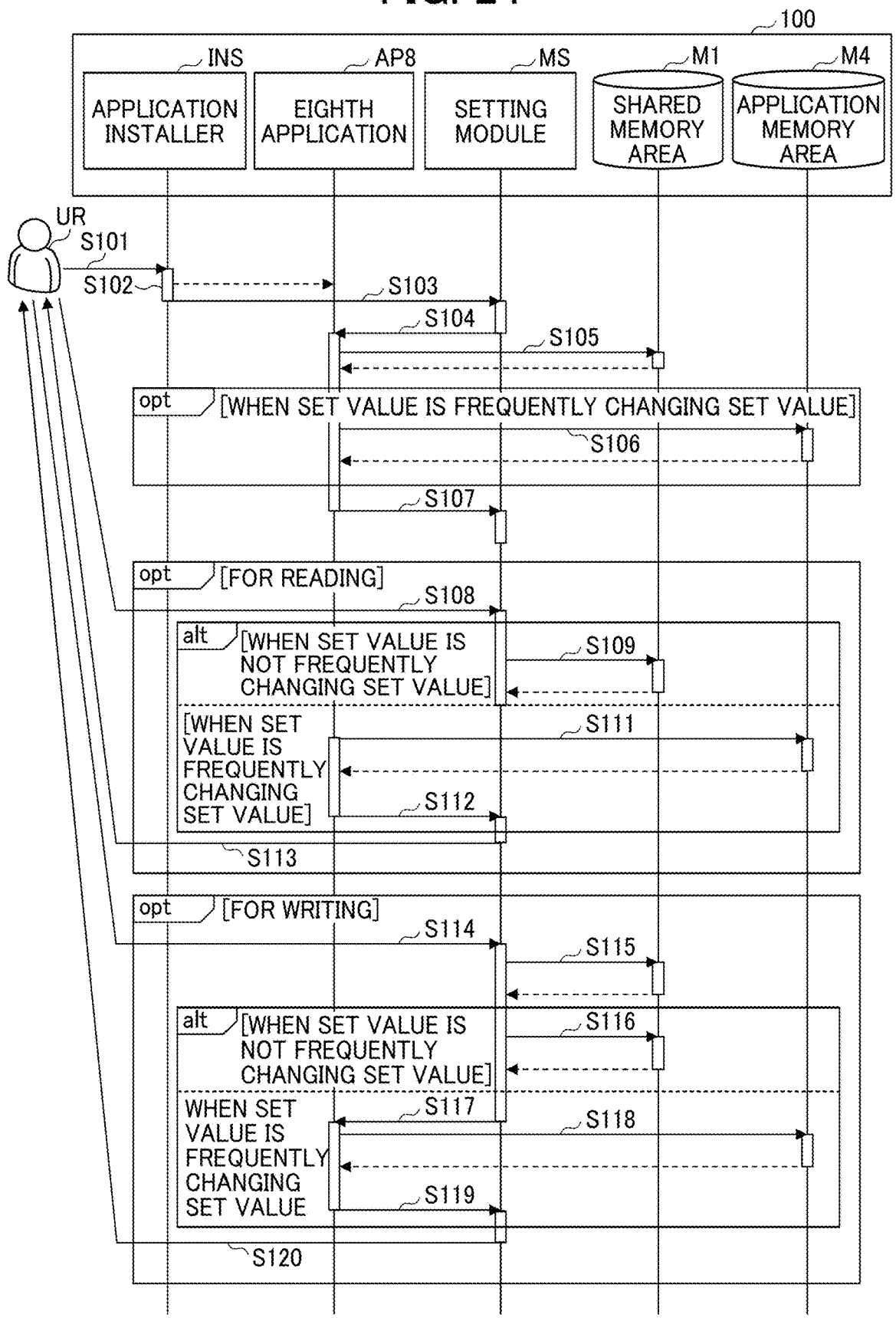

IMAGE FORMING APPARATUS, INFORMATION PROCESSING METHOD, AND NON-TRANSITORY COMPUTER-READABLE MEDIUM CONFIGURED TO DETERMINE A PROCESS TO PERFORM TO A SET VALUE, ENCRYPT AND STORE A SET VALUE IN A FIRST MEMORY AREA, WRITE OR READ A SET VALUE IN A SECOND MEMORY AREA

CROSS-REFERENCE TO RELATED APPLICATION

This patent application is based on and claims priority pursuant to 35 U.S.C. § 119(a) to Japanese Patent Application No. 2019-026085, filed on Feb. 15, 2019, the entire disclosure of which is incorporated herein by reference.

BACKGROUND

Technical Field

The present disclosure relates to an image forming apparatus, an information processing method, and a non-transitory computer-readable medium.

Description of the Related Art

Recent image forming apparatuses have various functions such as scanning and copying. To implement functions installed in such image forming apparatuses in advance, such as scanning and copying, a system program is generated to configure a screen for inputting set values to facilitate input of set values required for the functions. In the related art, when an additional program such as an application program to add a new function is developed and installed in such image forming apparatuses, if execution of the added function involves input of new set values, the system program needs to be changed so as to enable input of the set values for executing the added function.

For example, a plug-in program is known in the related art that is configured in a dynamically linkable with the system program so as not to require any change in the system program even when an additional program such as an application program that requires a new set value is newly installed. In the plug-in program, information for inputting set values to execute an additional function is described.

SUMMARY

According to one or more embodiments, an image forming apparatus includes an operation device coupled to the image forming apparatus and configured to accept an operation to the image forming apparatus. The image forming apparatus includes a memory including a first memory area configured to store a set value to be used by the image forming apparatus or the operation device. The image forming apparatus further includes circuitry configured to: accept an operation of writing or reading the set value; determine a type of a process to be performed on the set value; and perform the process in accordance with a determination result by the circuitry, to encrypt the set value and store the encrypted set value in the first memory area of the memory, write the set value to a second memory area in the memory, or read the set value from the second memory area.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 24 is a sequence diagram illustrating an example overall process according to the seventh embodiment.

Figure 1:
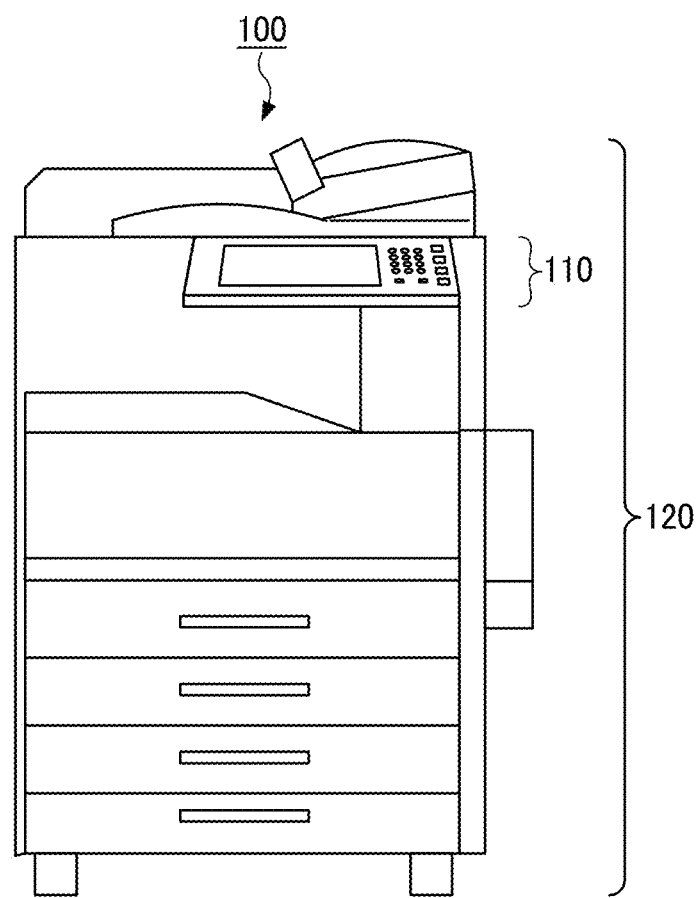
FIG. 1 is a schematic view illustrating an example of an overview of an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The following describes example embodiments with reference to the drawings.

First Embodiment

Example of Image Forming Apparatus

FIG. 1 is a schematic view illustrating an example general arrangement of an image forming apparatus. As illustrated in FIG. 1, an image forming apparatus 100 is a multifunction peripheral (MFP), for example. For example, the image forming apparatus 100 has image processing functions such as a copier function, a scanner function, a facsimile function, and a printer function. The image forming apparatus 100 may also have other functions (e.g., an error display function).

In the illustrated example, the image forming apparatus 100 includes an operation device 110. The image forming apparatus 100 further includes a main unit 120.

A user operates the operation device 110 to input various operations for the image forming apparatus 100. The image forming apparatus 100 performs image processing based on an operation using the operation device 110 and the main unit 120.

Example Hardware Configuration

Figure 2:
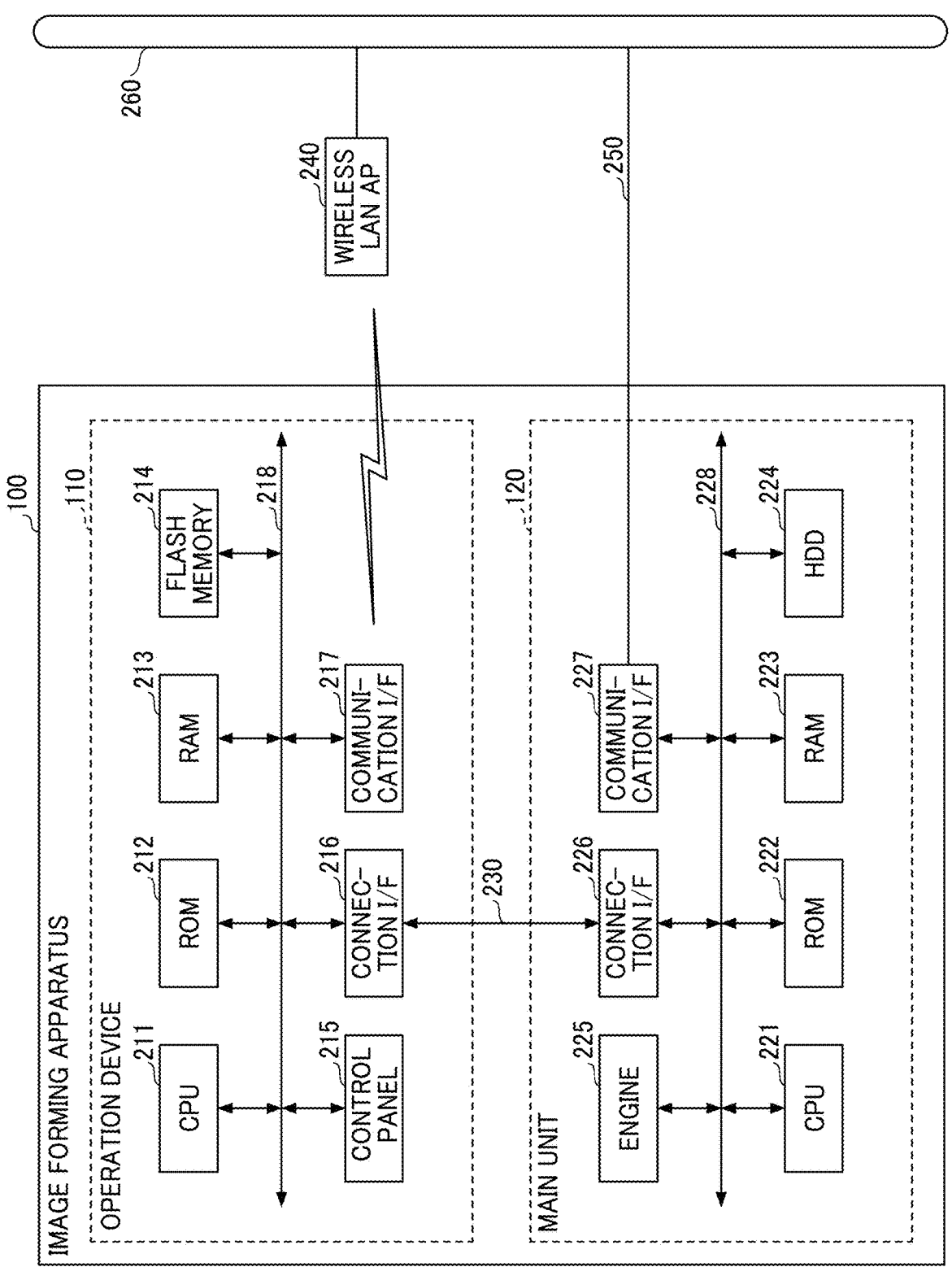
FIG. 2 is a block diagram illustrating an example hardware configuration of an operation device and a main unit, according to an embodiment of the present disclosure.

FIG. 2 is a block diagram illustrating an example hardware configuration of the operation device 110 and the main unit 120. The operation device 110 is a device having a hardware configuration including, for example, a central processing unit (CPU) 211, a read-only memory (ROM) 212, a random access memory (RAM) 213, a flash memory 214, a control panel 215, a connection interface (hereinafter referred to as "connection I/F") 216, and a communication interface (hereinafter referred to as "communication I/F") 217. As illustrated in FIG. 2, these hardware resources are coupled to each other via a bus 218.

The CPU 211 is an example of a computation device and a control device. The CPU 211 executes various programs stored in the ROM 212 or the flash memory 214 using a main memory device, such as the RAM 213, as a work area. With this control and computation, the CPU 211 controls the operation device 110 or the like and implements various functions.

The flash memory 214 is an example of a non-volatile storage medium. For example, the flash memory 214 stores programs and data.

The control panel 215 is an example of an input device and an output device. Specifically, the control panel 215 displays an operation screen and processing results. The control panel 215 accepts an operation performed by a user.

The connection I/F 216 is an interface that communicates with the main unit 120 via a communication path 230. The connection I/F 216 is a connector and a cable, for example. Specifically, the connection I/F 216 performs communication via Universal Serial Bus (USB) or the like.

The communication I/F 217 is an interface that communicates with an external device via a network 260. The communication I/F 217 is an antenna, for example. In the illustrated example, the communication I/F 217 accesses a wireless local area network (LAN) access point (AP) 240 and performs communication.

The main unit 120 is a device having a hardware configuration including, for example, a CPU 221, a ROM 222, a RAM 223, a hard disk drive (HDD) 224, an engine 225, a connection I/F 226, and a communication I/F 227. As illustrated in FIG. 2, these hardware resources are coupled to each other via a bus 228.

The CPU 221 is an example of a computation device and a control device. That is, as illustrated in FIG. 2, the computation device and the control device, which are used for the main unit 120, desirably have a different hardware configuration from the CPU 211 of the operation device 110.

The ROM 222 and the RAM 223 are examples of a memory device used for the main unit 120, like the CPU 221. Accordingly, the CPU 221 executes processing based on a program stored in an auxiliary memory device such as the ROM 222 and the HDD 224 using a main memory device such as the RAM 223.

The engine 225 is a processing device or the like for implementing image processing functions such as a copier function, a scanner function, a facsimile function, and a printer function. Specifically, the engine 225 is a processing integrated circuit (IC), for example. Specifically, the engine 225 includes a scanner that scans and reads a document, a plotter that prints on a sheet material, such as paper, a communication device that performs facsimile communication, or a combination thereof. The engine 225 may include a device that distributes printed sheet materials, called a finisher, an auto document feeder (ADF) that automatically feeds a document, or any other suitable device.

The connection I/F 226 is an interface that communicates with the operation device 110 via the communication path 230. The connection I/F 216 is a connector and a cable, for example. Specifically, the connection I/F 226 performs communication via USB or the like.

The communication I/F 227 is an interface that communicates with an external device via the network 260. Examples of the communication I/F 227 include a cable 250.

Example of Operation Device

Figure 3:
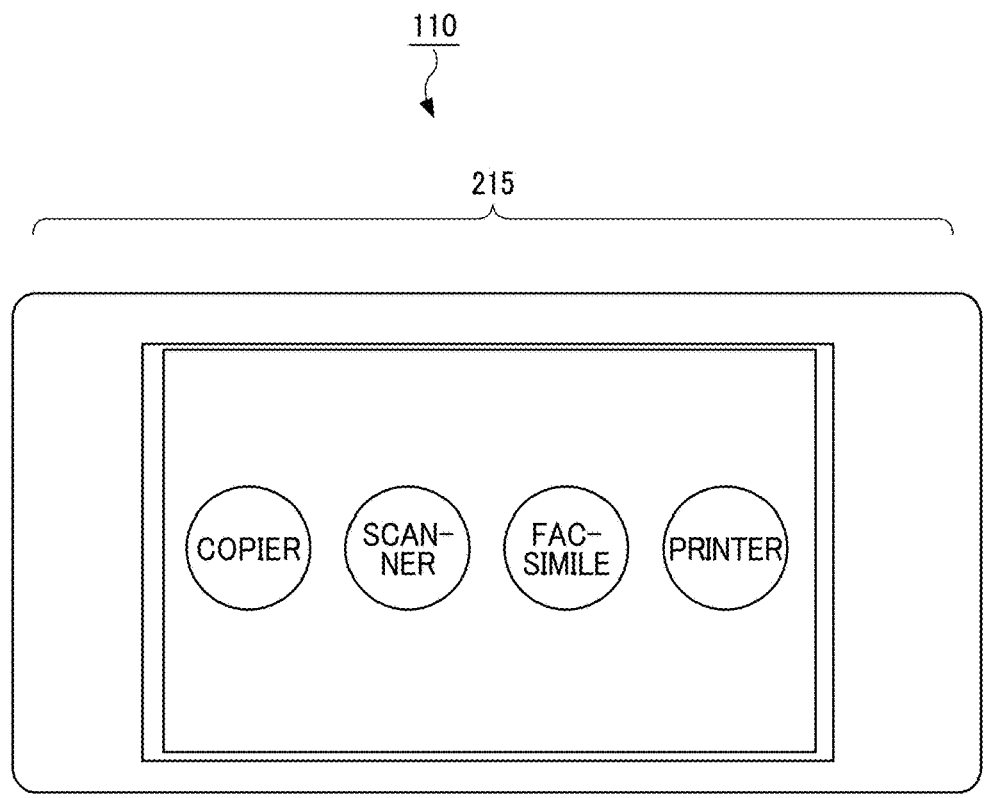
FIG. 3 is a schematic view illustrating an example external appearance of the operation device, according to an embodiment of the present disclosure.

FIG. 3 is a schematic view illustrating an example external appearance of the operation device 110. For example, the operation device 110 is a device having the external appearance illustrated in FIG. 3. Specifically, the operation device 110 displays an operation screen for the various functions of the image forming apparatus 100 by using the control panel 215, for example. In the illustrated example, the operation screen accepts operations for the "copier", "scanner", "facsimile", and "printer" functions. A so-called top-screen is illustrated, on which, for example, the "copier" button is pressed, thereby displaying an operation screen for making detailed settings for the "copier" function.

Further, the illustrated example is an example of a configuration for setting "initial settings" and an "address book".

When a button is pressed on the operation screen, the screen to be displayed next or set values to be set are configured using a menu or the like.

The operation device 110 is not necessarily implemented using the control panel 215 illustrated in FIG. 3. For example, the control panel 215 may have hard keys in addition to a touch panel. That is, an interface for operating an operation screen may have a configuration other than that illustrated in FIG. 3.

Example Software Configuration of Operation Device and Main Unit

Figure 4:
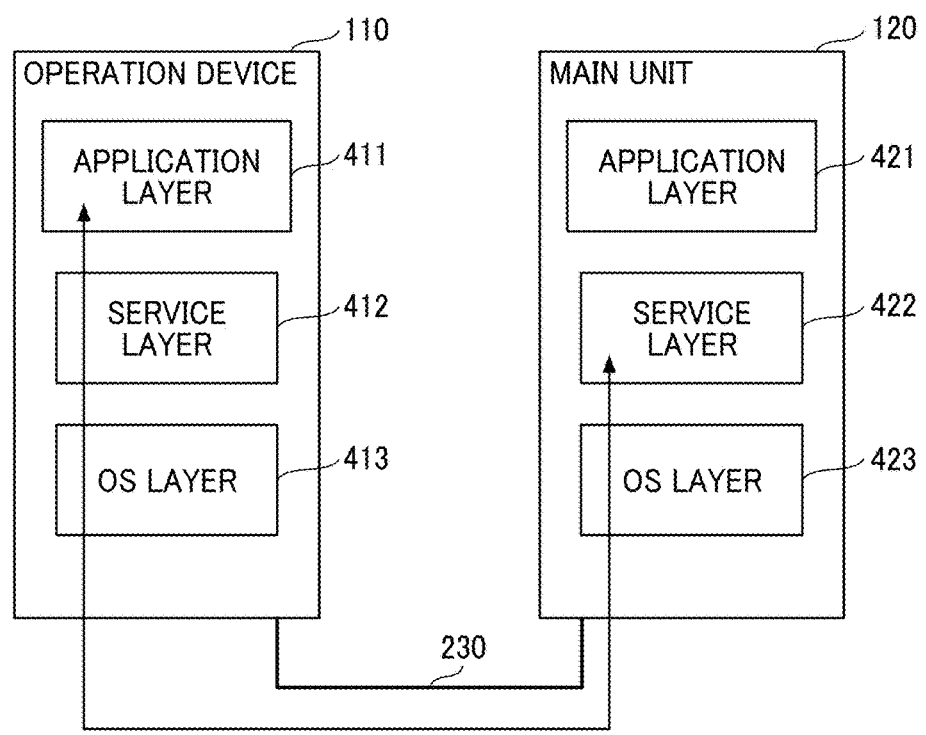
FIG. 4 is a block diagram illustrating an example software configuration of the operation device and the main unit, according to an embodiment of the present disclosure.

FIG. 4 is a block diagram illustrating an example software configuration of the operation device 110 and the main unit 120. The illustrated example provides a layered structure of software that is implemented as programs installed in the operation device 110 and the main unit 120.

First, the main unit 120 will be described. In the illustrated example, programs for creating, for example, an application layer 421, a service layer 422, and an operating system layer 423 (referred to as an "OS layer 423" hereinafter) are installed in an auxiliary memory device or the like of the main unit 120.

Programs as the application layer 421 cause the hardware resources included in the image forming apparatus 100 to operate to implement various functions. Specifically, the programs as the application layer 421 are a copier application, a facsimile application, a scanner application, and a printer application, for example.

A program as the service layer 422 resides between the application layer 421 and the OS layer 423. For example, the program as the service layer 422 implements an interface or the like that allows the hardware resources included in the main unit 120 to be used by the programs as the application layer 421 or that informs the application layer 421 of the states of the hardware resources included in the main unit 120.

Further, a program as the service layer 422 accepts operation requests for the hardware resources or arbitrates the accepted operation requests. Further, a program as the service layer 422 transmits an error detected in the hardware resources to the application layer 421 as an error notification. The operation requests accepted by the service layer 422 include an operation request for reading using a scanner, or an operation request for printing using a plotter, for example.

The role of the interface implemented by the program as the service layer 422 is similar to that for an application layer 411 in the operation device 110. Specifically, a program as the application layer 411 in the operation device 110 is capable of accessing a service layer 422 to cause the hardware resources of the main unit 120 to operate to implement image processing functions and the like.

A program as the OS layer 423 is a program or the like called basic software. The program as the OS layer 423 provides a basic function that controls the hardware resources included in the main unit 120. First, the program as the service layer 422 converts an operation request for a hardware resource, which is transmitted from a program as the application layer 421, into a command interpretable by the OS layer 423 and passes the command to the OS layer 423. Then, the program as the OS layer 423 executes the command to implement an image processing function in accordance with the operation request for the hardware resource. Further, when the program as the OS layer 423 is executed, a hardware resource receives a detected error. Then, the hardware resource passes the received error notification to the service layer 422 to transmit the error notification to the application layer 421.

Next, the operation device 110 will be described. In the illustrated example, programs for creating, for example, the application layer 411, the service layer 412, and an OS layer 413 are installed in an auxiliary memory device or the like of the operation device 110.

The functions implemented by a program as the application layer 411 and the types of operation requests acceptable by the service layer 412 are different from those for the main unit 120. Specifically, in the operation device 110, the program as the application layer 411 mainly provides a user interface function for operation and display related to the image processing functions implemented by the main unit 120.

In the illustrated example, the OS of the operation device 110 and the OS of the main unit 120 operate independently of each other. If the operation device 110 and the main unit 120 are capable of communicating with each other, the respective OS s may not be of the same type. For example, the operation device 110 may use Android (registered trademark), and the main unit 120 may use Linux (registered trademark).

In the image forming apparatus 100, as described above, for example, the operation device 110 and the main unit 120 are controlled by different OS s. Accordingly, communication between the operation device 110 and the main unit 120 is communication between different devices, rather than communication between processes in a single device. Examples of the communication include command communication for transmitting an operation performed by a user, which is accepted by the operation device 110, to the main unit 120, and event communication (e.g., an error notification or an error cancellation notification) for providing an instruction from the main unit 120 to the operation device 110 to display a display screen.

Example Data Configuration and Application Configuration

Figure 5:
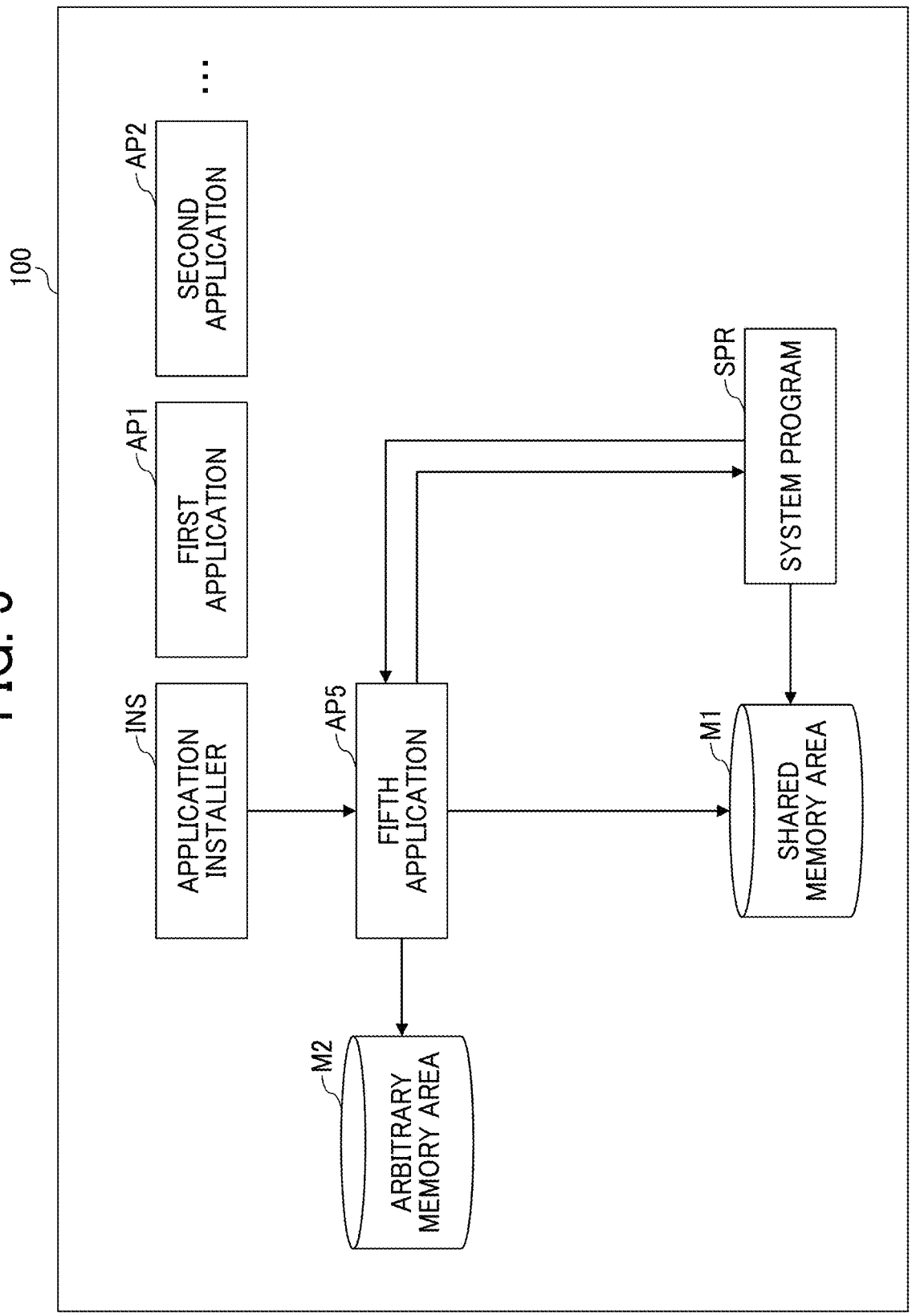
FIG. 5 is a block diagram illustrating an example data configuration and application configuration, according to an embodiment of the present disclosure.

FIG. 5 is a block diagram illustrating an example data configuration and application configuration. For example, as illustrated in FIG. 5, applications such as a first application AP1 and a second application AP2 are installed in the image forming apparatus 100 in advance. The image forming apparatus 100 further includes an application installer INS, which can be used to add an application such as a fifth application AP5.

As illustrated in FIG. 5, furthermore, the image forming apparatus 100 has a shared memory area M1, which is sharable by applications, a system program SPR, and so on. For example, set values provided in Table 1 below are stored in the shared memory area M1.

TABLE 1

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| . | . | . | . | . | . | . | . | . | . |
| Fifth Application | E001 | Character String | 8 to 255 Characters | Password | — | Other Settings > Fifth Application Settings | Set Value | Set Value | ... |
| Fifth Application | E002 | Multiple-Choice | Full-Color Monochrome, Grayscale | Default Color Mode | Full-Color | Other Settings > Fifth Application Settings | — | — | ... |
| Fifth Application | E003 | Multiple-Choice | ON, OFF | Fifth-Application Energy-Saving Priority Settings | ON | Other Settings > Fifth Application Settings, System Settings > Energy-Saving Settings | — | — | ... |
| . | . | . | . | . | . | . | . | . | . |
| . | . | . | . | . | . | . | . | . | . |
| . | . | . | . | . | . | . | . | . | . |

In Table 1, "setting owner" is an entity that sets a set value. Specifically, the setting owner "first application" indicates that the first application AP1 sets and uses a set value.
"ID" (Identification) indicates an identification number or the like. That is, when an ID is identified, a set value is identified.
"Set value type" indicates a format of set value. For example, "numerical value" indicates that a numerical value is set as a set value. For example, "character string" indicates that characters or the like is set as a set value. For example, "multiple-choice" indicates that a set value is selected from among options entered in advance in "input range". Any other set value type may be used.
"Input range" indicates a range, type, options, or the like that can be entered as a set value. Specifically, "0 to 10" indicates that a value in the range of "0" to "10" is set as a set value. A value outside the "input range" is determined to be an error.
"Title" indicates a character or the like that describes a set value to be displayed on a setting screen or the like.
"Set value" indicates a set value that is currently set. The symbol "—" indicates that the corresponding set value is not stored in the shared memory area M1.
"Location" indicates a location of a setting screen relative to a home screen when each set value is set via a graphical user interface (GUI) and locations for set values and setting screens are in a tree structure. For example, the description "other settings > first application settings" indicates that the user presses the "other settings" button on an initial setting screen and then presses the "first application settings" button on the next setting screen to go to a setting screen for setting the target set value.

Specifically, setting screens transition in the following way, for example.

Figure 6:
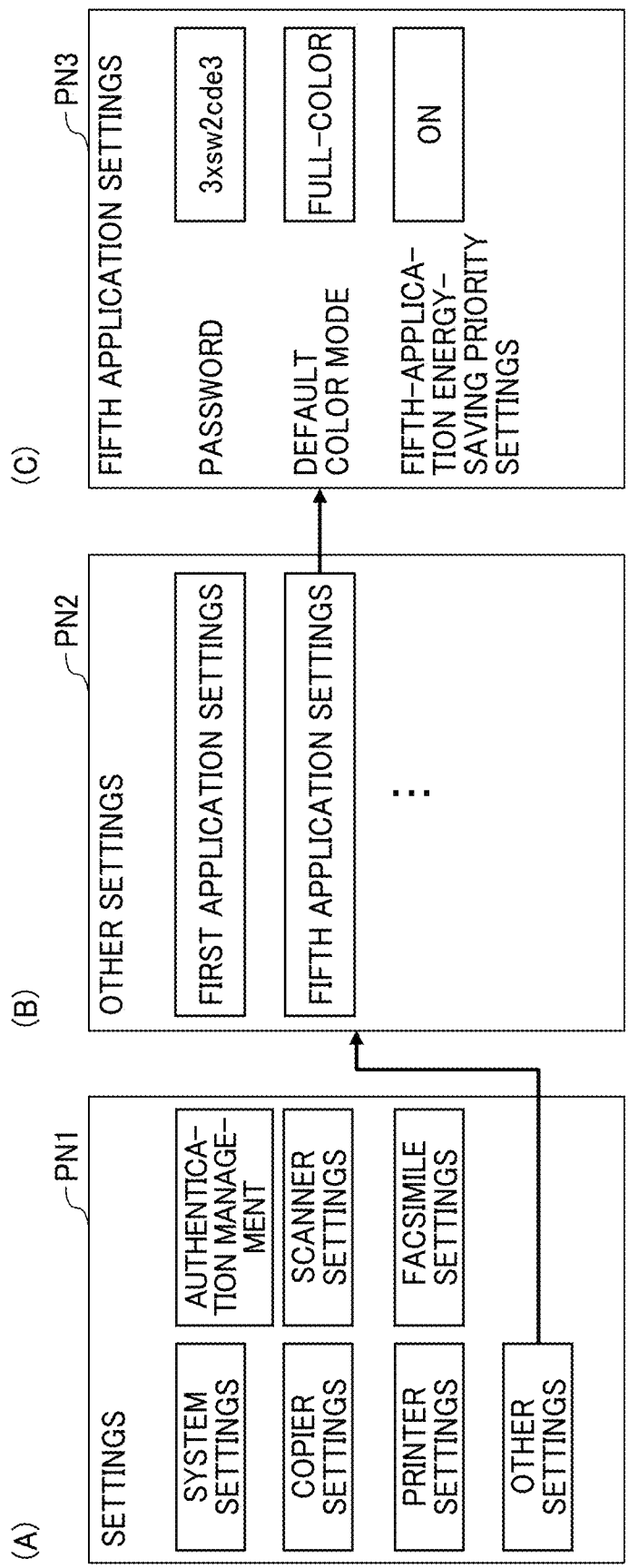
FIG. 6 illustrates an example transition of setting screens, according to an embodiment of the present disclosure.

FIG. 6 illustrates an example transition of setting screens.

For example, first, a setting screen (A) illustrated in FIG. 6 is assumed to be displayed. The setting screen (A) of is a home screen (hereinafter referred to as "first setting screen PN1") with which setting begins. When the "other settings" button is pressed on the first setting screen PN1, the setting screen transitions to a screen (B) illustrated in FIG. 6 (hereinafter referred to as "second setting screen PN2").

When the "fifth application settings" button is pressed on the second setting screen PN2, the setting screen transitions to a screen (C) illustrated in FIG. 6 (hereinafter referred to as "third setting screen PN3"). As illustrated in FIG. 6, the third setting screen PN3 is a setting screen for operating set values for the fifth application AP5. Accordingly, in the configuration having the set values provided in Table 1 above, the set values for the IDs "E001", "E002", and "E003" are registered as set values for the fifth application AP5. These set values are set on the third setting screen PN3.

Specifically, in the illustrated example, the item displayed as "password" on the third setting screen PN3 corresponds to the set value for the ID "E001" in Table 1 above. The item displayed as "default color mode" on the third setting screen PN3 corresponds to the set value for the ID "E002" in Table 1 above. The item displayed as "fifth-application energy-saving priority settings" on the third setting screen PN3 corresponds to the set value for the ID "E003" in Table 1 above.

In Table 1 above, respective values are directly entered in "set value" associated with the IDs "E002" and "E003". That is, the respective set value for the IDs "E002" and "E003" are stored in the shared memory area M1. Accordingly, the values displayed on the setting screen are obtained from the "set value" in the shared memory area M1.

In contrast, the "set value" associated with the ID "E001" contains a value represented by "-" in Table 1 above. In this case, processing is performed in the following way on the basis of a value entered in "read request" in Table 1 above, for example.

"Read request" indicates whether a set value to be read is stored in the shared memory area M1 or any other memory area. In the example in Table 1 above, the "read request" containing a value represented by "-" indicates that the corresponding set value is stored in the shared memory area M1, or corresponds to the value in the "set value" in Table 1 above. In the example in Table 1 above, the "read request" containing a value represented by "set value" indicates that the corresponding set value is stored in an arbitrary memory area M2. For example, when the "read request" containing a value represented by "set value", data provided in Table 2 below (hereinafter referred to as "password data") is stored in the arbitrary memory area M2.

TABLE 2

| ID | Set Value |
|---|---|
| E001 | 3xsw2cde3 |

As provided in Table 2 above, the password data represents data such as "ID" and "set value". Specifically, "ID" indicates an identification number or the like that matches the corresponding ID in Table 1 above. A value representing a password is entered in "set value". That is, the value to be entered in the "set value" associated with the ID "E001" in Table 1 above (corresponding to the value represented by "-" in Table 1 above) is stored in the arbitrary memory area M2 in form of password data, as provided in Table 2 above.

In Table 1 above, "write request" indicates whether to store a set value to be written (or overwritten) in the shared memory area M1 or any other memory area. In the illustrated example, as in the "read request", when the "write request" contains a value represented by "-", the corresponding set value is written to the shared memory area M1. When the "write request" contains a value represented by "set value", the corresponding set value is written to the arbitrary memory area M2 in form of password data.

The "read request" and the "write request" may contain so-called flag data. For example, when the content to be stored in the arbitrary memory area M2 is set in advance, the "read request" or the "write request" containing a value represented by "TRUE" may indicate that the set value to be read or written is stored in the arbitrary memory area M2. The "read request" or the "write request" containing a value represented by "FALSE" may indicate that the set value to be read or written is stored in the shared memory area M1. For example, a storage destination may be specified using this method.

The arbitrary memory area M2 is desirably a secure memory area. That is, the arbitrary memory area M2 is desirably a memory area whose security is guaranteed. Specifically, whereas the shared memory area M1 is a memory area accessible through an OS or any application, the arbitrary memory area M2 is accessible through limited applications, for example. In the illustrated example, for example, access to the arbitrary memory area M2 from applications other than the fifth application AP5 is rejected. No data can be changed in and obtained from such a memory area without the intervention of a specific application, and unauthorized processing or information leakage is likely to be prevented.

A secure memory area may be provided using a method other than by limiting accessible applications. For example, a secure memory area may be provided by performing a predetermined authentication process to access the memory area or protecting the memory area using a security system such as a firewall.

Example Overall Process

Figure 7:
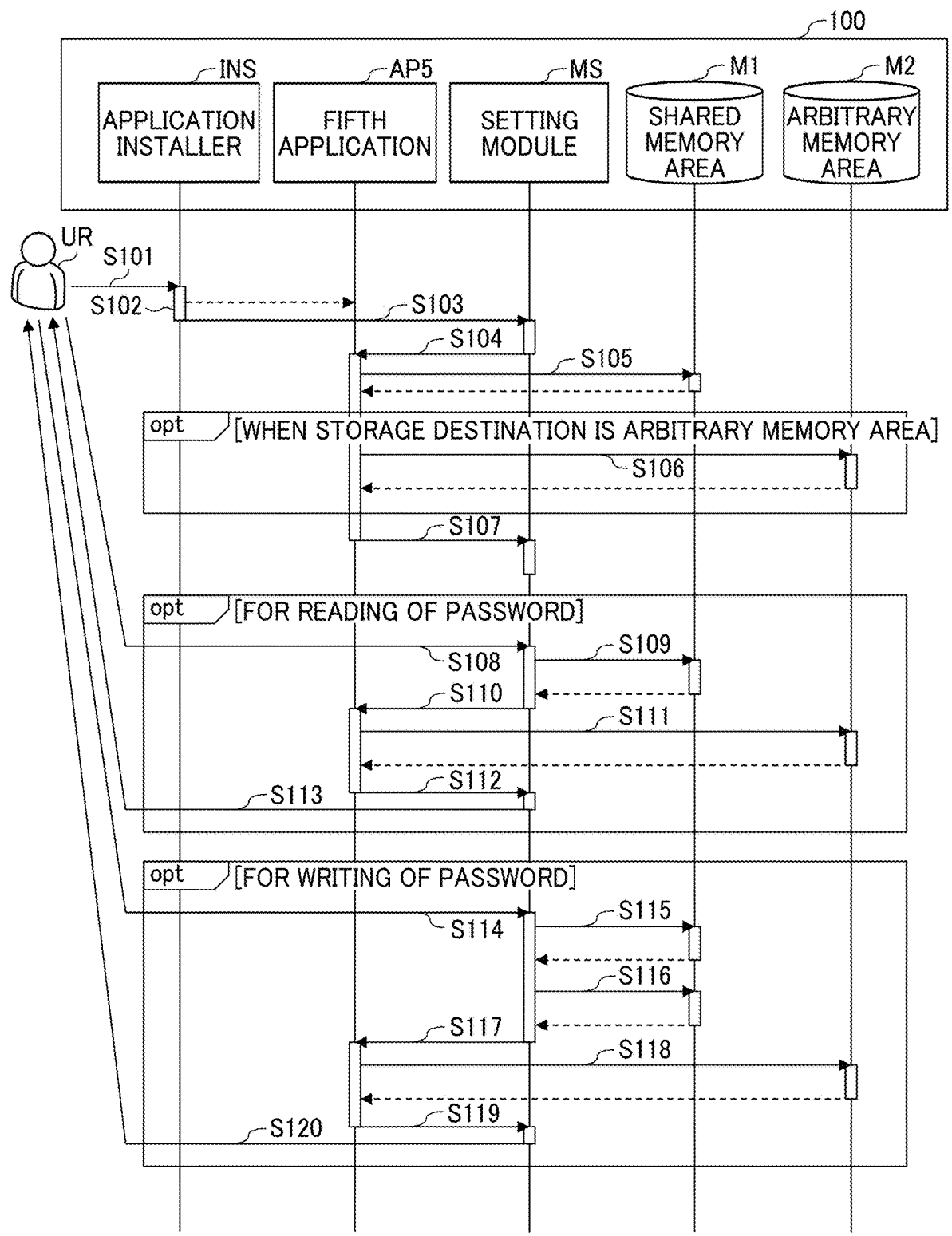
FIG. 7 is a sequence diagram illustrating an example overall process, according to an embodiment of the present disclosure.

FIG. 7 is a sequence diagram illustrating an example overall process. For example, the illustrated overall process implements the data configuration and the application configuration described above.

First, as initialization processing, for example, steps S101 to S107 are performed.

In step S101, the application installer INS accepts an operation of additionally installing the fifth application AP5 by a user UR.

In step S102, the application installer INS additionally installs the fifth application AP5.

In step S103, the application installer INS notifies a setting module MS of installation of the fifth application AP5.

In step S104, the setting module MS makes a request to store a set value.

In step S105, the fifth application AP5 writes a set value to the shared memory area M1. A set value such as a set value for the ID "E001" in Table 1 above is determined to be written to the arbitrary memory area M2.

Specifically, in the example in Table 1 above, when the "write request" contains a value represented by "-", the fifth application AP5 determines that the storage destination is the shared memory area M1. When the "write request" contains a value represented by "set value", the fifth application AP5 determines that the storage destination is the arbitrary memory area M2. Accordingly, if it is determined that the storage destination is the arbitrary memory area M2 ("WHEN STORAGE DESTINATION IS ARBITRARY MEMORY AREA"), the fifth application AP5 performs the processing of step S106.

In step S106, the fifth application AP5 writes the set value to the arbitrary memory area M2.

In step S107, the fifth application AP5 notifies the setting module MS of completion of the initialization of the set values.

If the set value for the ID "E001" in Table 1 above is to be read after the initialization described above has been performed ("FOR READING OF PASSWORD"), the image forming apparatus 100 proceeds to step S108.

Likewise, if the set value for the ID "E001" in Table 1 above is to be written after the initialization has been performed ("FOR WRITING OF PASSWORD"), the image forming apparatus 100 proceeds to step S114.

In step S108, the setting module MS accepts an instruction to display a setting screen. For example, the processing of step S108 is performed in response to an instruction to display the third setting screen PN3. In this case, the set value starts to be read.

In step S109, the setting module MS reads a set value from the shared memory area M1. As in step S105, the set value for the ID "E001" in Table 1 above is determined to be read from the arbitrary memory area M2 in accordance with the value contained in the "read request". In the illustrated example, the set value is read from the arbitrary memory area M2 via the fifth application AP5.

Some set values may be read. For example, in the example in Table 1 above, data for one row is to be read in the read operation. On the contrary, not all of the pieces of data for one row may be read. For example, only a set value related to the "input range" may be to be read.

In step S110, the setting module MS makes a request to read a set value.

In step S111, the fifth application AP5 reads the set value from the arbitrary memory area M2 in accordance with the request.

In step S112, the fifth application AP5 returns the set value obtained in step S111 in response to the request.

In step S113, the setting module MS displays a setting screen. For example, the setting module MS displays a setting screen such as the third setting screen PN3.

In step S114, the setting module MS accepts an instruction to write a set value. For example, the processing of step S114 is performed in response to an instruction to change the set value for the password on the third setting screen PN3. In this case, the set value starts to be written.

In step S115, the setting module MS reads a set value from the shared memory area M1. Then, the setting module MS determines whether there is a set value whose storage destination is the arbitrary memory area M2, such as a value represented by "set value" in the "write request" in Table 1 above.

In step S116, the setting module MS writes a set value to the shared memory area M1. The set value for the ID "E001" in Table 1 above is written via the fifth application AP5. If a plurality of set values are to be written and are set values whose storage destinations are the shared memory area M1, rather than set values whose storage destinations are the arbitrary memory area M2 such as the set value for the ID "E001", the set values are written to the shared memory area M1 in step S116. Accordingly, a plurality of set values may be collectively written.

In step S117, the setting module MS makes a request to write a set value.

In step S118, the fifth application AP5 writes the set value to the arbitrary memory area M2 in accordance with the request.

In step S119, the fifth application AP5 provides a response indicating that the set value is written in step S118 in accordance with the request.

In step S120, the setting module MS displays a setting screen. For example, the setting module MS presents a completion of the writing of the set value on a setting screen such as the third setting screen PN3.

Example Functional Configuration

Figure 8:
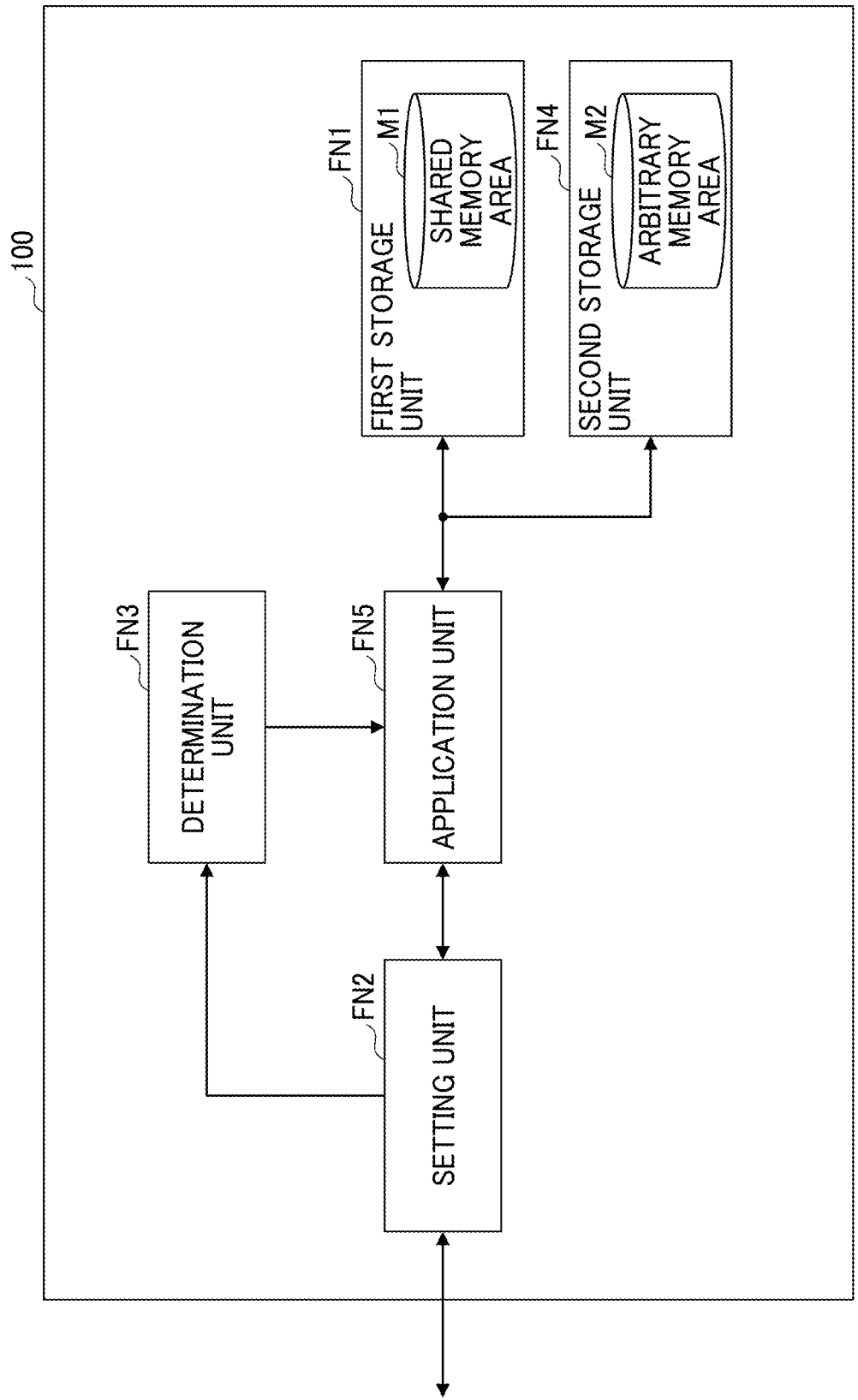
FIG. 8 is a block diagram illustrating an example functional configuration of the image forming apparatus, according to an embodiment of the present disclosure.

FIG. 8 is a functional block diagram illustrating an example functional configuration of the image forming apparatus 100. For example, the image forming apparatus 100 has a functional configuration including a first storage unit FN1, a determination unit FN3, a second storage unit FN4, a setting unit FN2, and an application unit FN5. The following describes the illustrated functional configuration, by way of example.

The first storage unit FN1 performs a first storage procedure for storing a set value to be used by the image forming apparatus 100 or the operation device 110. The first storage unit FN1 is implemented by the flash memory 214, for example. Specifically, the first storage unit FN1 forms a memory area such as the shared memory area M1.

The second storage unit FN4 performs a second storage procedure for storing a set value to be used by the image forming apparatus 100 or the operation device 110, separately from the first storage unit FN1. The second storage unit FN4 is implemented by the flash memory 214, for example. Specifically, the second storage unit FN4 forms a memory area such as the arbitrary memory area M2.

The setting unit FN2 performs a setting procedure for accepting an operation of writing or reading a set value. The setting unit FN2 is implemented by the control panel 215, for example.

The application unit FN5 performs an application procedure for writing a set value to the second storage unit FN4 or reading a set value from the second storage unit FN4. The application unit FN5 is implemented by the CPU 211, for example.

The determination unit FN3 performs a determination procedure for determining a storage destination of a set value. The determination unit FN3 is implemented by the CPU 211, for example.

The image forming apparatus 100 stores set values to be used by applications and so on. The image forming apparatus 100 determines and switches, for each set value, a memory area, or storage destination, in which the set value is to be stored. For example, as in the example in Tables 1 and 2 above, sensitive information such as a password is stored in a secure memory area, such as the second storage unit FN4, as a storage destination. Other information is stored in a memory area shared by an OS or a plurality of applications, such as the first storage unit FN1, as a storage destination.

In this way, the determination unit FN3 determines a storage destination based on the "write request" or the "read request". Based on the determination result, the application unit FN5 determines a storage destination in the process of writing or reading a set value. This configuration enables a set value to be stored in a desired memory area according to, for example, the confidentiality of the information.

Even with the configuration that uses separate memory areas, for example, when the setting unit FN2 displays a setting screen, the application unit FN5 performs a process of reading a set value from the second storage unit FN4. On the other hand, the application unit FN5 performs a process of also reading a set value from the first storage unit FN1. This allows set values to be displayed on the setting screen, regardless of which memory area each of the set values is stored in, as illustrated in the screen (C) of FIG. 6, for example.

Second Embodiment

A second embodiment is different from the first embodiment in an overall process. Hereinafter, the difference will be mainly described, and redundant description is omitted.

Figure 9:
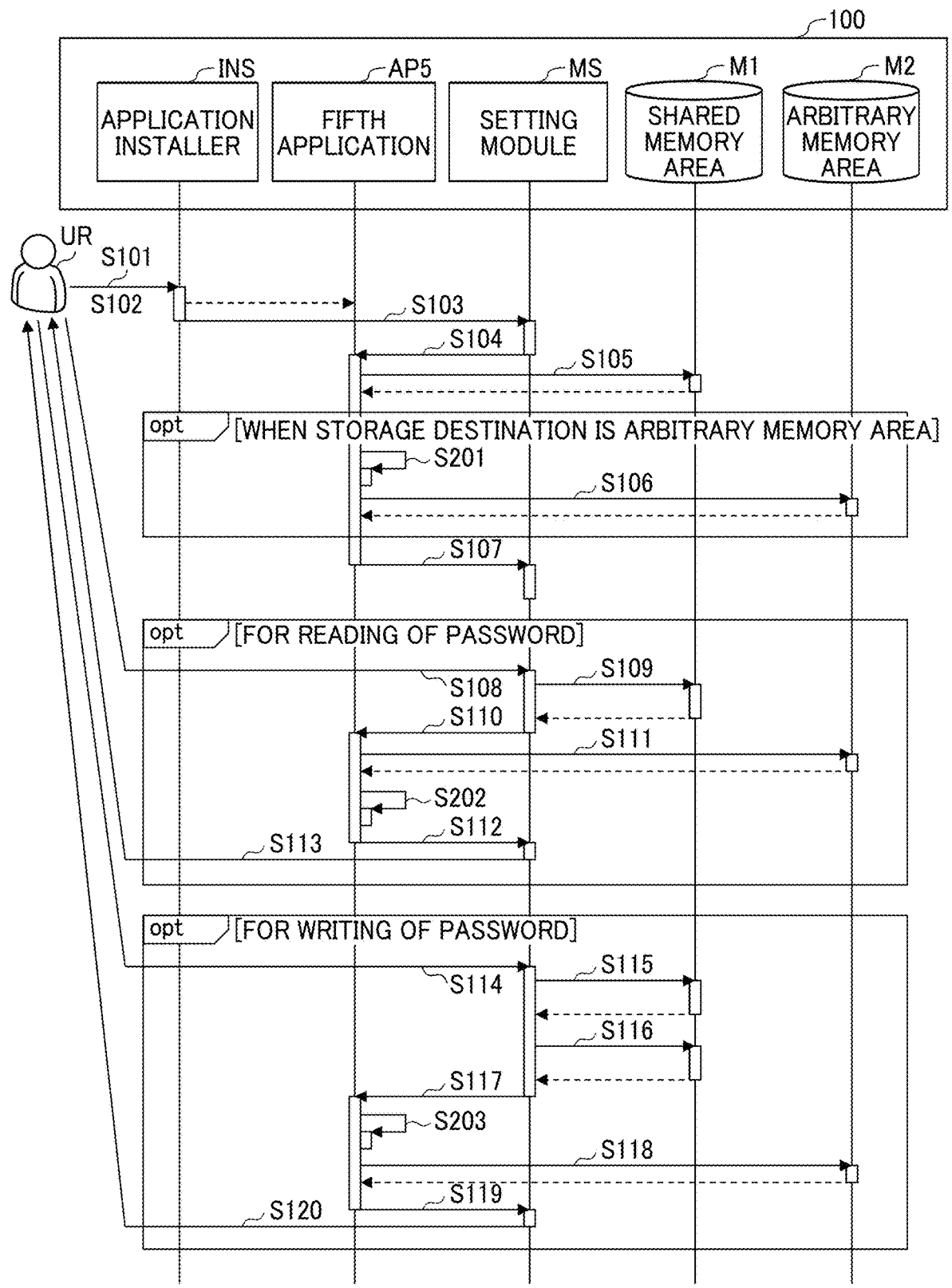
FIG. 9 is a sequence diagram illustrating an example overall process according to a second embodiment.

FIG. 9 is a sequence diagram illustrating an example overall process according to the second embodiment. Hereinafter, the same processing operations as those in the first embodiment are denoted by the same numerals and will not be described. Unlike the first embodiment, the processing of steps S201, S202, and S203 is additionally performed.

In step S201, the fifth application AP5 encrypts a set value. That is, the fifth application AP5 converts the set value from plaintext into ciphertext.

Accordingly, in step S106, the set value in ciphertext (hereinafter referred to as "encrypted set value") is to be written.

In step S202, the fifth application AP5 decrypts a read encrypted set value. That is, the fifth application AP5 converts the set value from ciphertext into plaintext.

In step S203, the fifth application AP5 encrypts a set value. That is, the fifth application AP5 converts the set value from plaintext into ciphertext.

Accordingly, in step S118, the encrypted set value is to be written.

As a result of the overall process described above, for example, password data provided in Table 3 below is stored in the arbitrary memory area M2.

TABLE 3

| ID | Set Value |
|---|---|
| E001 | Encrypted (3xsw2cde3) |

With this configuration, for example, even if password data is acquired by unauthorized access to the arbitrary memory area M2, the password data is in obfuscated form, and thus information such as the password is less likely to be obtained without authorization. Accordingly, this configuration can further improve security of the image forming apparatus 100.

For example, encryption and decryption may be implemented using Advanced Encryption Standard (AES). Other examples of the encryption and decryption processing include a process of encoding data by run length encoding or the like for encryption and lossless compression of the data.

Third Embodiment

A third embodiment is different from the first embodiment in data configuration, overall process, and functional configuration. Hereinafter, the differences will be mainly described, and redundant description is omitted. The same components as those in the first embodiment are denoted by the same numerals and will not be described.

Example Data Configuration and Application Configuration

Figure 10:
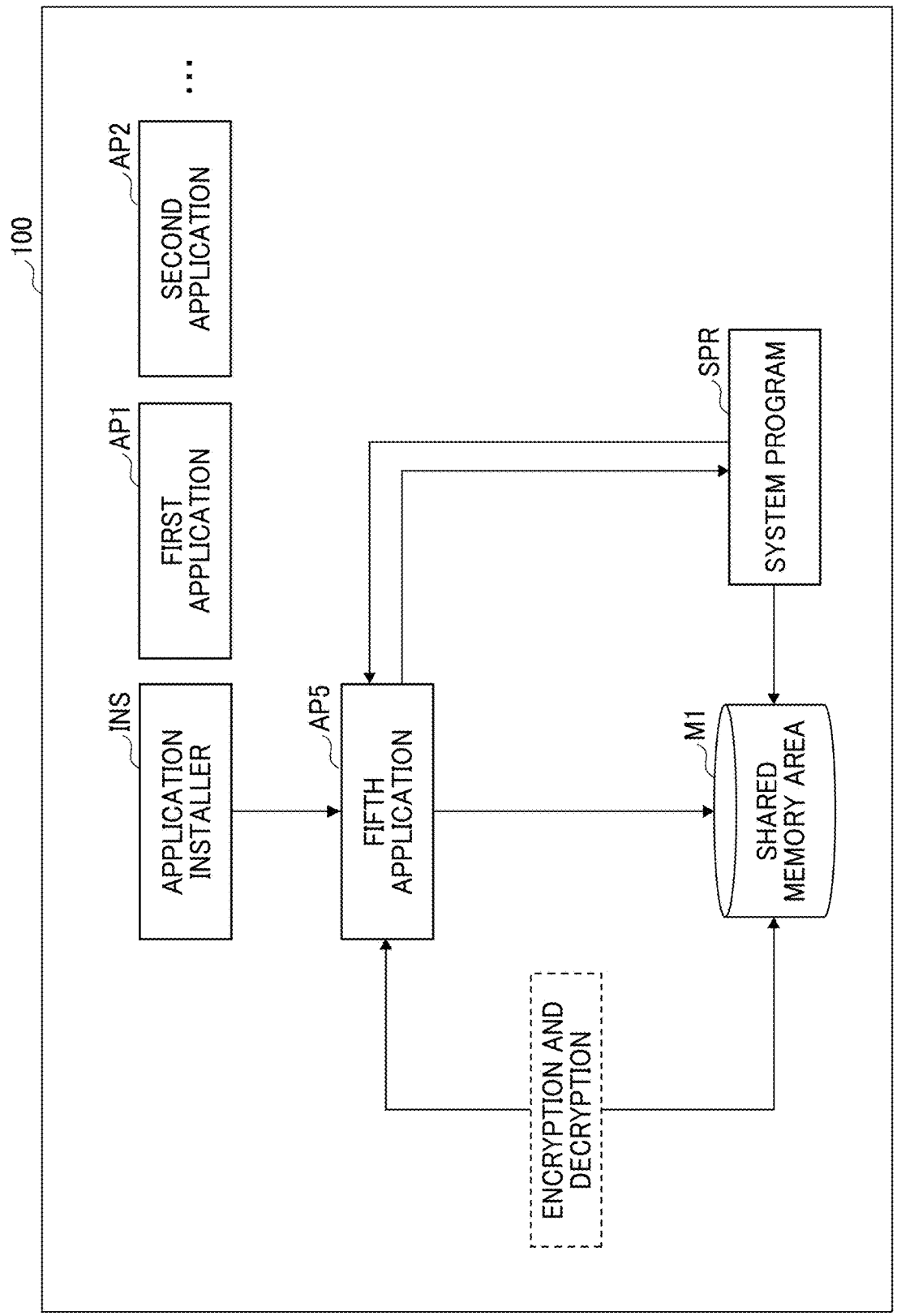
FIG. 10 is a block diagram illustrating an example data configuration and application configuration according to a third embodiment.

FIG. 10 is a block diagram illustrating an example data configuration and application configuration according to the third embodiment. In the illustrated example configuration, unlike the first embodiment, only the shared memory area M1 is used as a memory area. In the illustrated example configuration, furthermore, a set value to be written or read may or may not be encrypted and decrypted depending on the situation.

In the illustrated example configuration, the fifth application AP5 stores even a set value including sensitive information, such as the set value for the ID "E001", in the shared memory area M1 as a storage destination in a way similar to that for the other set values. The determination of whether a set value includes sensitive information is based on, for example, whether the "write request" or the "read request" contains a value represented by "set value".

If it is determined that the set value includes sensitive information such as a password, the fifth application AP5 encrypts the set value and writes the encrypted set value to the shared memory area M1. In the read operation, the fifth application AP5 reads and decrypts the encrypted set value.

Accordingly, for example, set values provided in Table 4 below are stored in the shared memory area M1.

If it is determined that the set value is to be encrypted ("FOR DATA TO BE ENCRYPTED"), the fifth application AP5 proceeds to step S201.

In step S301, the fifth application AP5 writes an encrypted set value, which is generated by encryption in step S201, to the shared memory area M1 as a storage destination.

In step S302, the fifth application AP5 reads an encrypted set value from the shared memory area M1 as a storage destination. Thereafter, in step S202, the encrypted set value read in step S302 is to be decrypted.

In step S303, the fifth application AP5 writes an encrypted set value, which is generated by encryption in step S203, to the shared memory area M1 as a storage destination.

Example Functional Configuration

Figure 12:
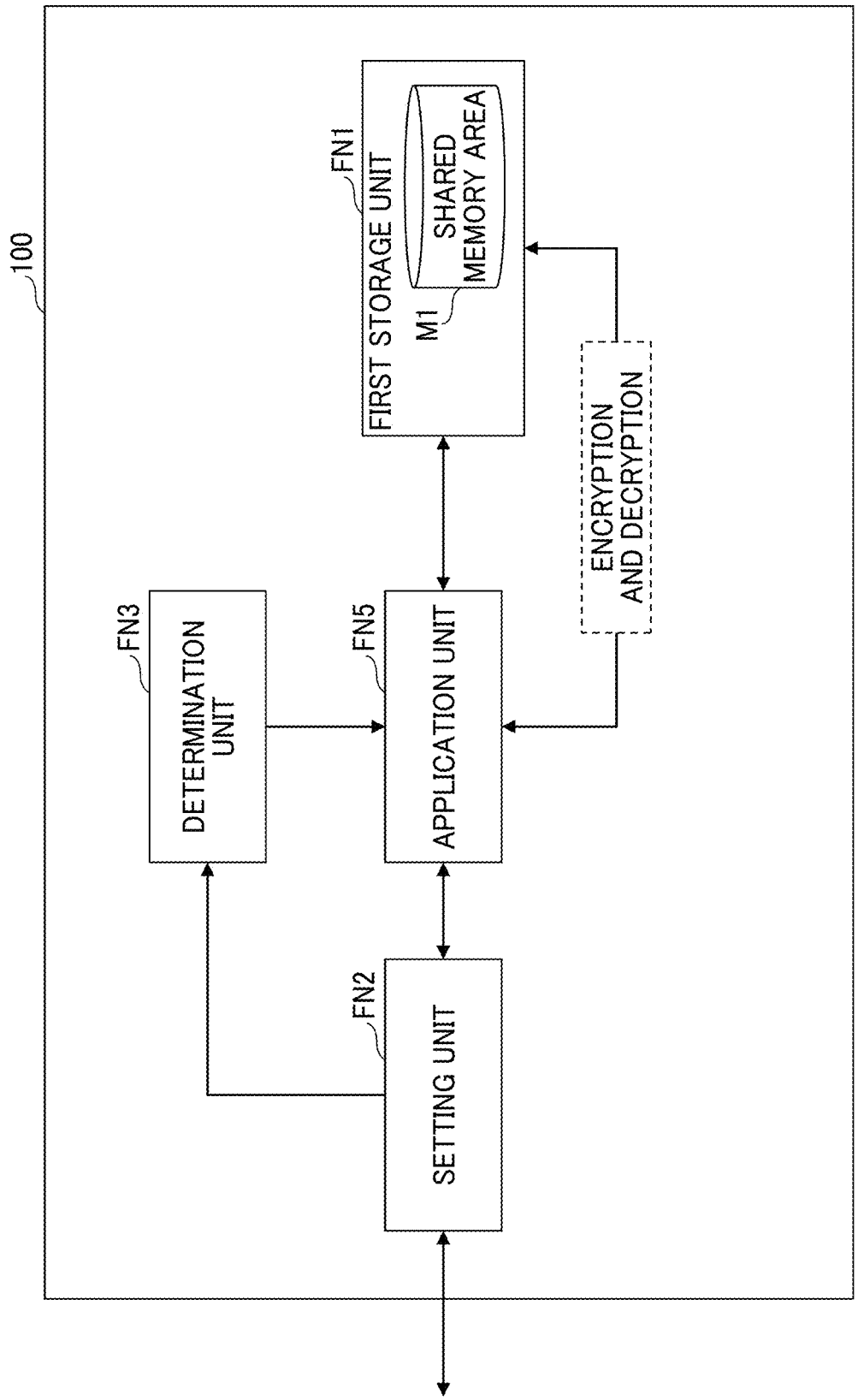
FIG. 12 is a block diagram illustrating an example functional configuration of an image forming apparatus according to the third embodiment.

FIG. 12 is a functional block diagram illustrating an example functional configuration of an image forming apparatus 100 according to the third embodiment. The third embodiment is different from the first embodiment mainly in the determination unit FN3 and the application unit FN5.

The determination unit FN3 performs a determination procedure for determining whether to encrypt a set value.

The application unit FN5 performs an application procedure for switching between writing of a set value after encryption and writing of a set value in plaintext without encryption in accordance with the determination result obtained by the determination unit FN3.

TABLE 4

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| . | . | . | . | . | . | . | . | . | . |
| Fifth Application | E001 | Character String | 8 to 255 Characters | Password | Encrypted (3xsw2cde3) | Other Settings > Fifth Application Settings | Set Value | Set Value | ... |
| Fifth Application | E002 | Multiple-Choice | Full-Color Monochrome, Grayscale | Default Color Mode | Full-Color | Other Settings > Fifth Application Settings | — | — | ... |
| Fifth Application | E003 | Multiple-Choice | ON, OFF | Fifth-Application Energy-Saving Priority Settings | ON | Other Settings > Fifth Application Settings, System Settings > Energy-Saving Settings | — | — | ... |
| . | . | . | . | . | . | . | . | . | . |
| . | . | . | . | . | . | . | . | . | . |
| . | . | . | . | . | . | . | . | . | . |

In Table 4, unlike Table 1 above, an encrypted set value is stored in the "set value" associated with the ID "E001".

Example Overall Process

Figure 11:
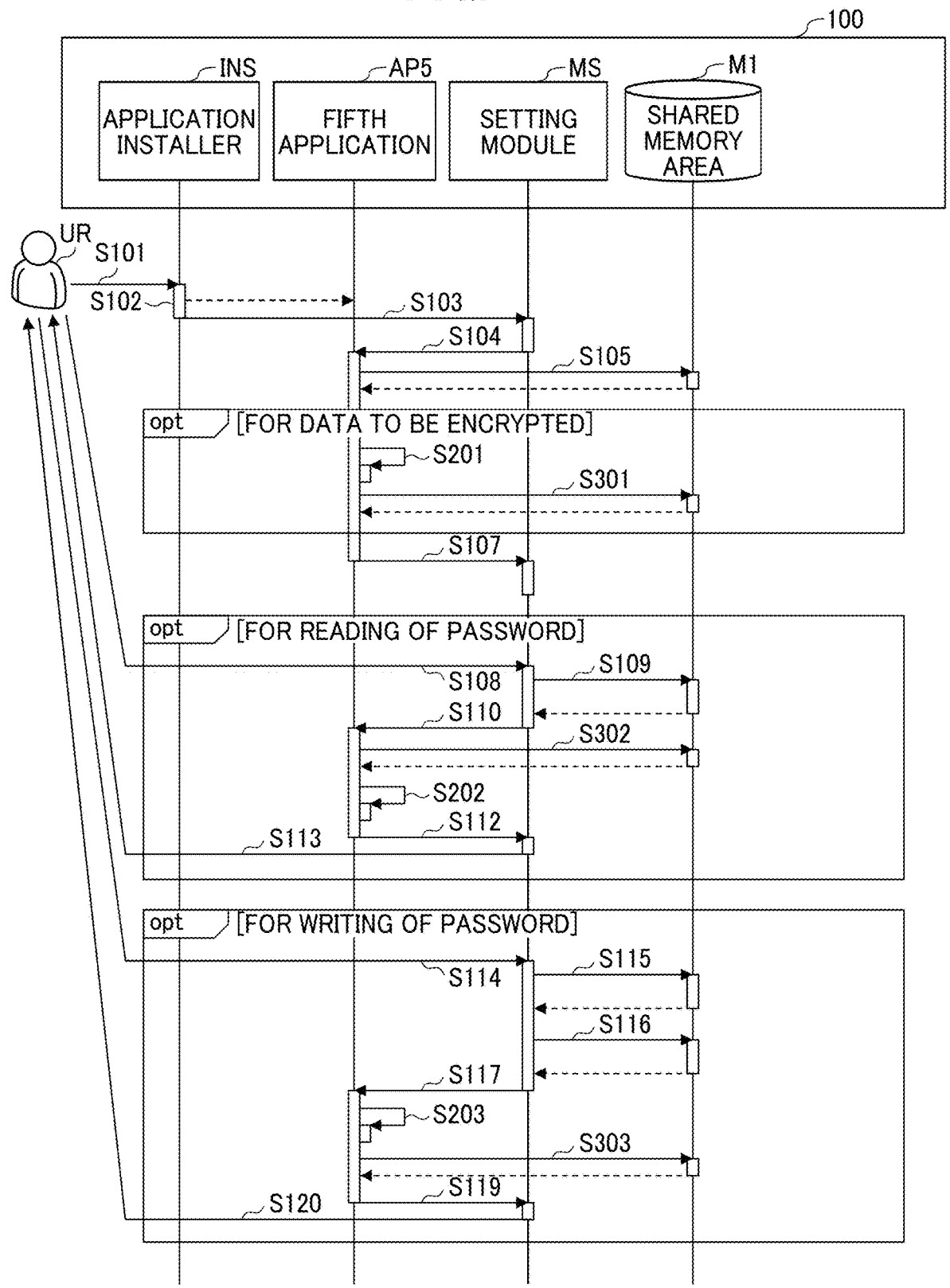
FIG. 11 is a sequence diagram illustrating an example overall process according to the third embodiment.

FIG. 11 is a sequence diagram illustrating an example overall process according to the third embodiment. In the third embodiment, unlike the second embodiment, steps S301, S302, and S303 are performed and different determination processing is performed in step S105.

In step S105, when a set value to be written is the set value for the ID "E001" in Table 3 above, the fifth application AP5 determines that the set value is to be encrypted.

In the third embodiment, the image forming apparatus 100 switches, for each set value, whether to encrypt and decrypt the set value. For example, as in the example in Table 4 above, some set values include sensitive information such as a password. When a set value, such as for a password, is to be stored in a memory area shared by an OS or a plurality of applications, such as the first storage unit FN1, as a storage destination, the set value is encrypted and is stored in the memory area in obfuscated form.

Accordingly, in response to the determination unit FN3 determining, based on, for example, the "write request" or the "read request", whether to encrypt a set value, the application unit FN5 determines whether to write the set value after the set value has been encrypted or to write the set value in plaintext. This configuration enables a set value to be stored in a memory area such as the first storage unit FN1 according to, for example, the confidentiality of the information.

Even with the configuration that includes an encrypted set value, for example, when the setting unit FN2 displays a setting screen, the application unit FN5 performs a process of reading the set value from the first storage unit FN1 and then decrypting the read set value. On the other hand, the application unit FN5 performs a process of reading a plaintext set value from the first storage unit FN1. This allows set values including even an encrypted set value to be displayed on the setting screen, as illustrated in the screen (C) of FIG. 6, for example.

Fourth Embodiment

A fourth embodiment is different from the first embodiment in data configuration, overall process, and functional configuration. Hereinafter, the differences will be mainly described, and redundant description is omitted. The same components as those in the first embodiment are denoted by the same numerals and will not be described.

Example Data Configuration and Application Configuration

Figure 13:
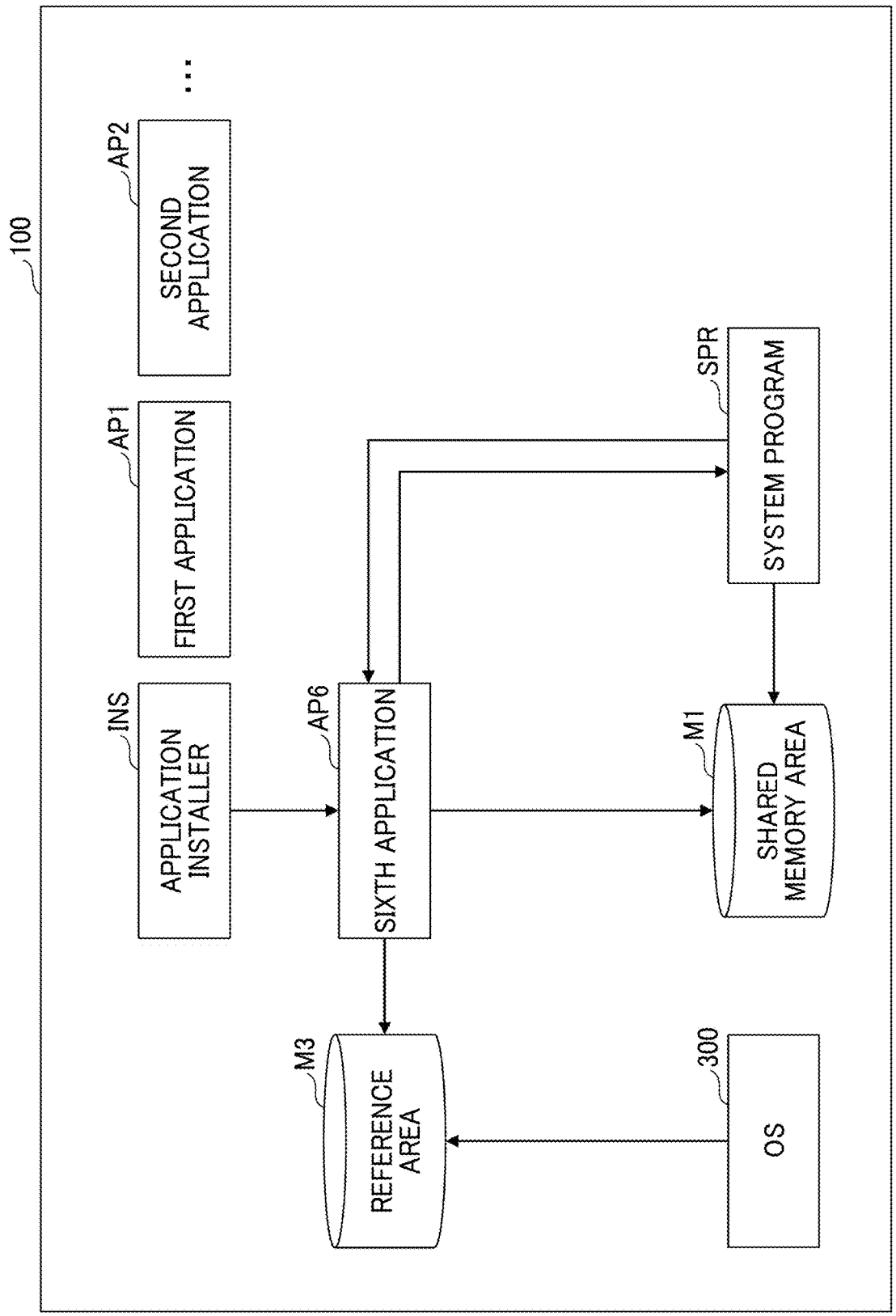
FIG. 13 is a block diagram illustrating an example data configuration and application configuration according to a fourth embodiment.

FIG. 13 is a block diagram illustrating an example data configuration and application configuration according to the fourth embodiment. In the fourth embodiment, unlike the first embodiment, the storage destinations of set values are the shared memory area M1, and a memory area (hereinafter referred to as "reference area M3") is referred to by an OS 300. In the fourth embodiment, furthermore, an application added by the application installer INS is represented by a sixth application AP6.

As illustrated in FIG. 13, the image forming apparatus 100 has the shared memory area M1, which is sharable by applications, the system program SPR, and so on. For example, set values provided in Table 5 below are stored in the shared memory area M1.

Unlike Table 1 above, Table 5 above contains set values for the IDs "F001" and "F002". In the example in Table 5 above, the set value for the ID "F001" is an example of a set value whose storage destination is the reference area M3.

As in the first embodiment, to designate the reference area M3 as a storage destination, a value represented by "-" is set in the "set value", and a value represented by "set value" is set in the "read request" or the "write request". Accordingly, as in the first embodiment, the image forming apparatus 100 determines a storage destination for writing or reading, based on the setting of the "read request" or the "write request".

When the "read request" contains a value represented by "set value", that is, in the case of the set value for the ID "F001", data provided in Table 6 below (hereinafter referred to as "audio volume data") is stored in the reference area M3.

TABLE 6

| ID | Set Value |
|---|---|
| F001 | 10 |

As provided in Table 6 above, the audio volume data indicates data such as "ID" and "set value". Specifically, "ID" indicates an identification number or the like that matches the corresponding ID in Table 1 above. A value representing an audio volume (an example of a value for setting the intensity level of a sound to be output from a device such as a speaker) is entered in "set value".

A set value such as the set value for the ID "F001" is referred to by the OS 300. Such a set value may sometimes be stored in a storage destination that is a unique memory area determined by the specifications of the system depending on the system. Such a set value is set in the following way, for example.

Figure 14:
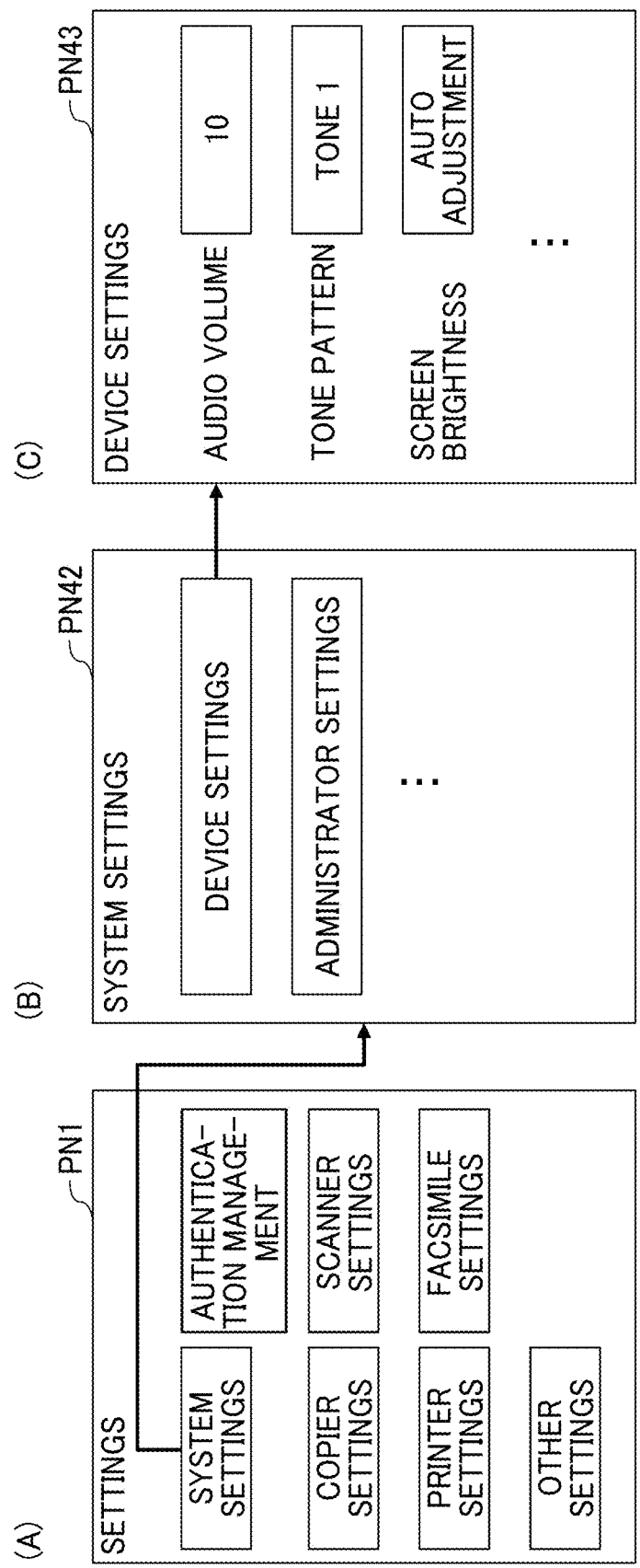
FIG. 14 illustrates an example transition of setting screens according to the fourth embodiment.

FIG. 14 illustrates an example transition of setting screens according to the fourth embodiment. For example, first, as illustrated in a screen (A) of FIG. 14, when the "system settings" button is pressed on the first setting screen PN1, then, as illustrated in a screen (B) of FIG. 14, the setting screen transitions to a setting screen for performing setting for the system (hereinafter referred to as "system settings screen PN42").

TABLE 5

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| Sixth Application | F001 | Numerical Value | 0 to 15 | Audio Volume | — | System Settings > Device Settings | Set Value | Set Value | ... |
| Sixth Application | F002 | Multiple-Choice | Tone 1, Tone 2, Tone 3, Tone 4, Tone 5 | Tone Pattern | Tone 1 | Other Settings > Sixth Application Settings | — | — | ... |
| . | . | . | . | . | . | . | . | . | . |
| . | . | . | . | . | . | . | . | . | . |

When the "device settings" button is pressed on the system settings screen PN42, as illustrated in a screen (C) of FIG. 14, the setting screen transitions to a setting screen for performing setting related to a device (hereinafter referred to as "device settings screen PN43").

Example Overall Process

Figure 15:
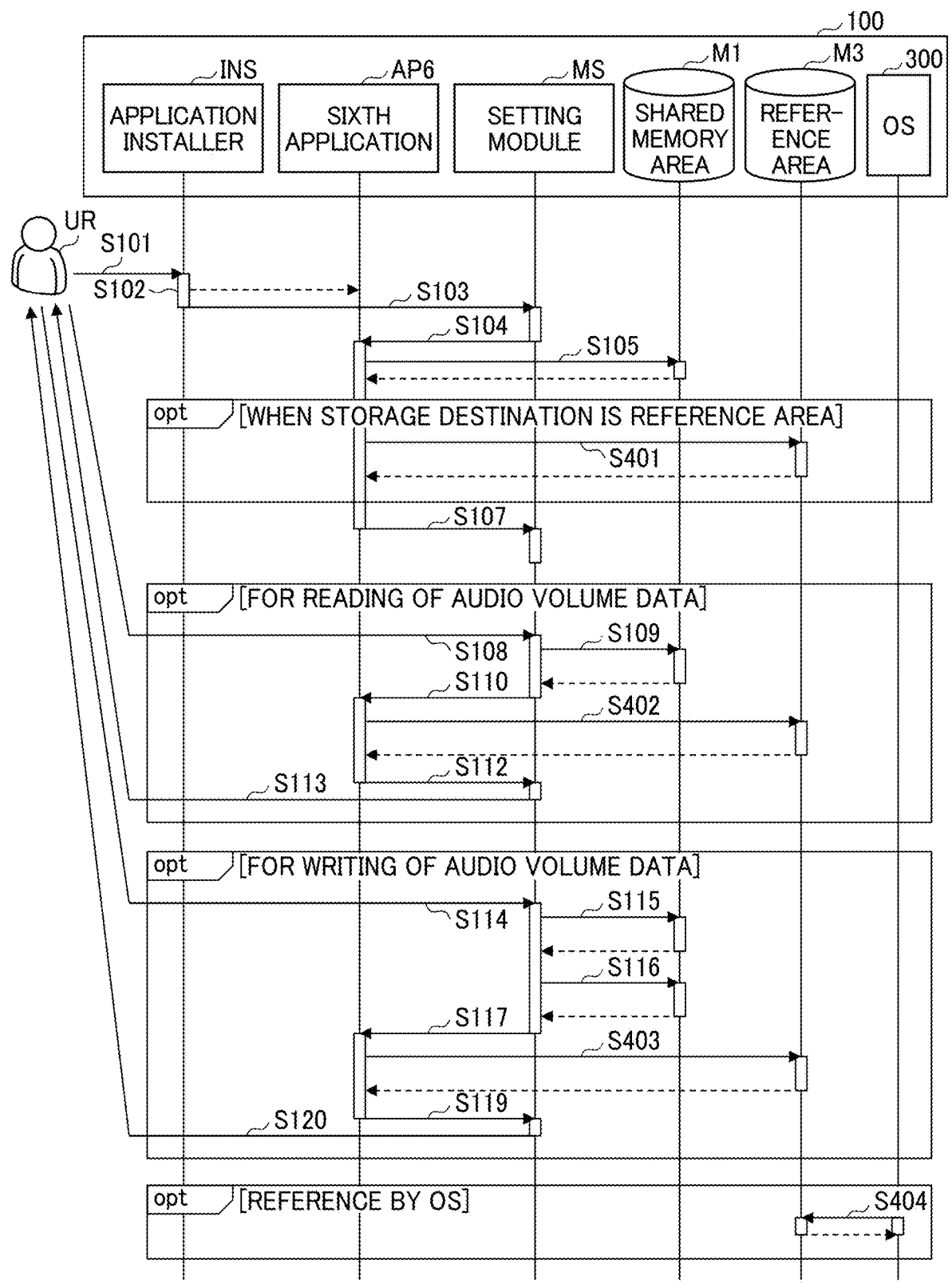
FIG. 15 is a sequence diagram illustrating an example overall process according to the fourth embodiment.

FIG. 15 is a sequence diagram illustrating an example overall process according to the fourth embodiment. In the fourth embodiment, unlike the first embodiment, steps S401, S402, S403, and S404 are performed, and different determination processing is performed in step S105.

In step S105, when a set value to be written is the set value for the ID "F001" in Table 5 above, the sixth application AP6 determines that the set value is to be stored in the reference area M3 as a storage destination.

If it is determined that the storage destination of the set value is the reference area M3 ("WHEN STORAGE DESTINATION IS REFERENCE AREA"), the sixth application AP6 proceeds to step S401.

In step S401, the sixth application AP6 writes a set value to the reference area M3. If the set value for the ID "F001" in Table 5 above is to be read after the initialization described above has been performed ("FOR READING OF AUDIO VOLUME DATA"), the image forming apparatus 100 proceeds to step S108.

Likewise, if the set value for the ID "F001" in Table 5 above is to be written after the initialization has been performed ("FOR WRITING OF AUDIO VOLUME DATA"), the image forming apparatus 100 proceeds to step S114.

In step S402, the sixth application AP6 reads a set value from the reference area M3 in accordance with the request made in step S110.

In step S403, the sixth application AP6 writes the set value to the reference area M3 in accordance with the request made in step S117.

When the OS 300 is to refer to the set value ("REFERENCE BY OS"), the operation proceeds to step S404.

In step S404, the OS 300 reads a set value from the reference area M3.

Example Functional Configuration

Figure 16:
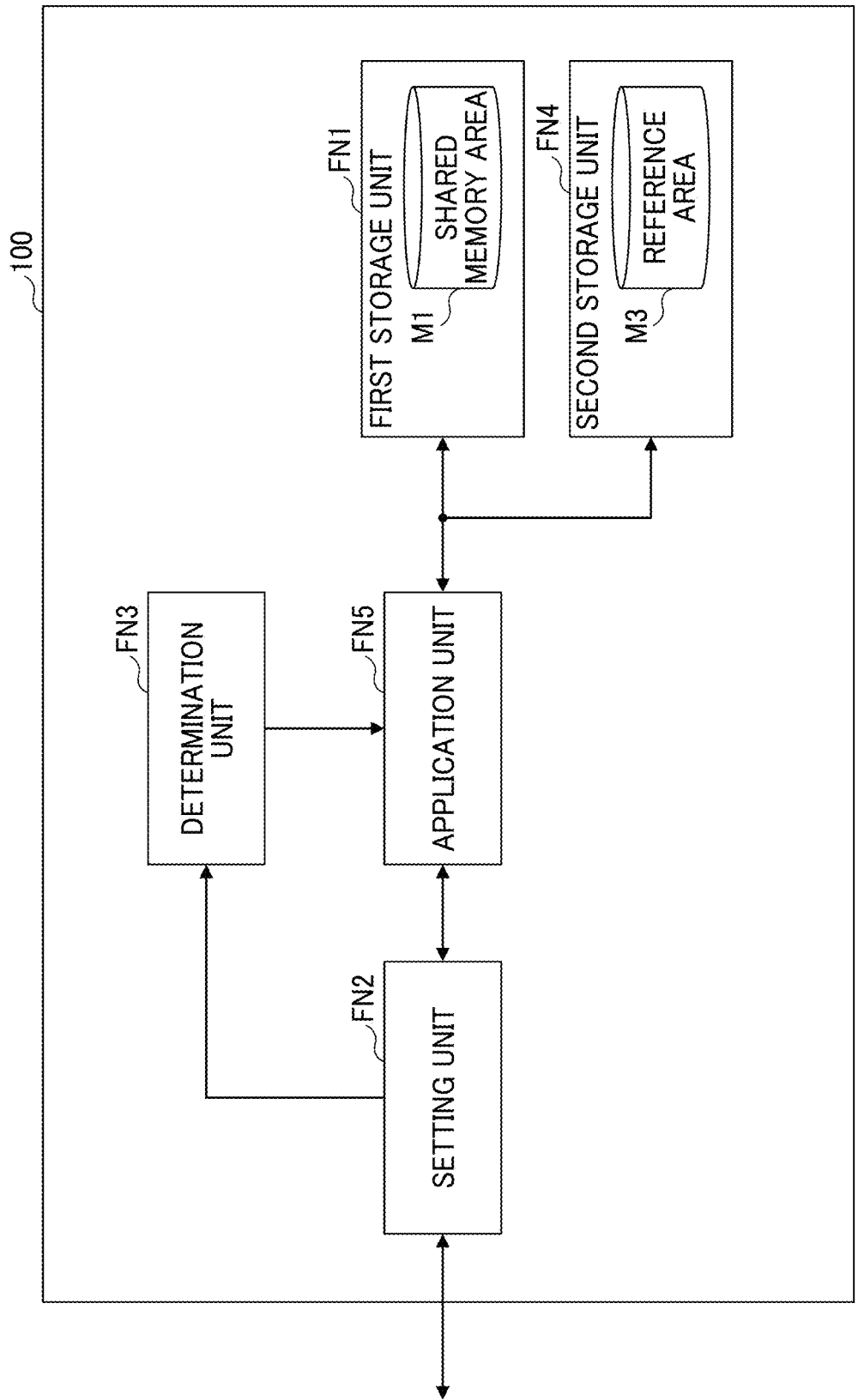
FIG. 16 is a functional block diagram illustrating an example functional configuration of an image forming apparatus according to the fourth embodiment.

FIG. 16 is a functional block diagram illustrating an example functional configuration of an image forming apparatus 100 according to the fourth embodiment. Unlike the first embodiment, the memory area formed by the second storage unit FN4 is the reference area M3.

The image forming apparatus 100 stores set values to be used by the OS 300, applications, and so on. The image forming apparatus 100 determines and switches, for each set value, a memory area, or storage destination, in which the set value is to be stored. For example, as in the example in Tables 5 and 6 above, device settings information is stored in the reference area M3 determined in accordance with the specifications and so on, such as the second storage unit FN4, as a storage destination. Other information is stored in a memory area shared by the OS 300 or a plurality of applications, such as the first storage unit FN1, as a storage destination, as in the first embodiment.

Accordingly, the application unit FN5 determines a storage destination in the process of writing or reading a set value in accordance with the determination of a storage destination by the determination unit FN3 based on the "write request" or the "read request". This configuration enables a set value to be stored in a desired memory area according to, for example, the settings of the system program.

Even with the configuration that uses separate memory areas, for example, when the setting unit FN2 displays a setting screen, the application unit FN5 performs a process of reading a set value from the second storage unit FN4. On the other hand, the application unit FN5 performs a process of also reading a set value from the first storage unit FN1. This allows set values to be displayed on the setting screen, regardless of which memory area each of the set values is stored in, as illustrated in the screen (C) of FIG. 14, for example. In addition, even a set value to be referred to by the OS 300 can be read and displayed on the setting screen, such as the device settings screen PN43.

This configuration can add the settings of an application without changing the shared system program or the like.

Fifth Embodiment

A fifth embodiment is different from the first embodiment in data configuration and overall process. Hereinafter, the differences will be mainly described, and redundant description is omitted. The same components as those in the first embodiment are denoted by the same numerals and will not be described.

Example Data Configuration and Application Configuration

Figure 17:
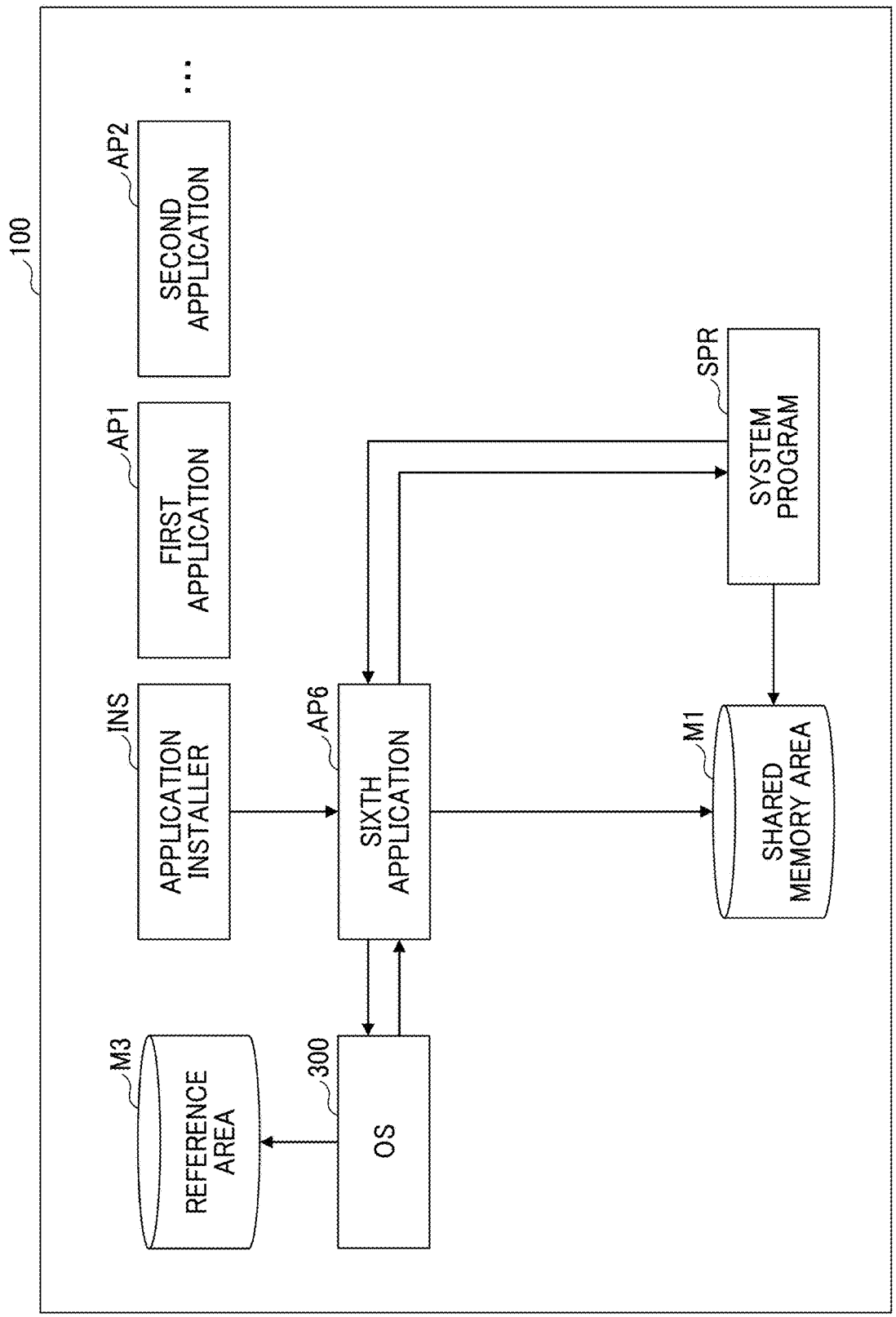
FIG. 17 is a block diagram illustrating an example data configuration and application configuration according to a fifth embodiment.

FIG. 17 is a block diagram illustrating an example data configuration and application configuration according to the fifth embodiment. In the fifth embodiment, unlike the fourth embodiment, a set value is written to and read from the reference area M3 via the OS 300.

Example Overall Process

Figure 18:
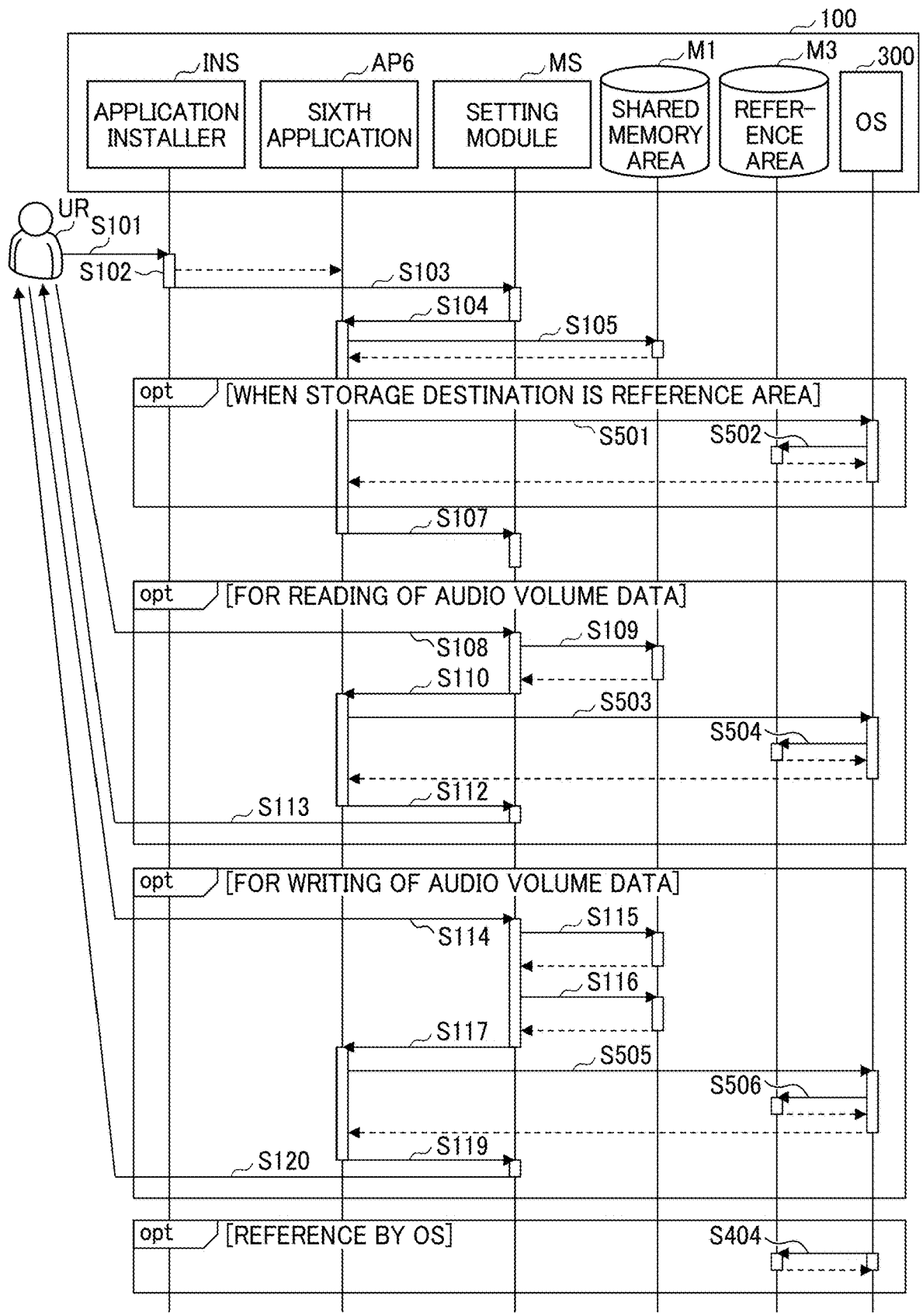
FIG. 18 is a sequence diagram illustrating an example overall process according to the fifth embodiment.

FIG. 18 is a sequence diagram illustrating an example overall process according to the fifth embodiment. In the fifth embodiment, unlike the fourth embodiment, steps S501, S502, S503, S504, S505, and S506 are performed.

In step S501, the sixth application AP6 submits a request to the OS 300 to write a set value in accordance with the determination performed in step S105.

In step S502, the OS 300 writes the set value to the reference area M3 in accordance with the request submitted in step S501.

In step S503, the sixth application AP6 submits a request to the OS 300 to read a set value in accordance with the determination performed in step S109.

In step S504, the OS 300 reads the set value from the reference area M3 in accordance with the request submitted in step S503.

In step S505, the sixth application AP6 submits a request to the OS 300 to write a set value in accordance with the determination performed in step S115.

In step S506, the OS 300 writes the set value to the reference area M3 in accordance with the request submitted in step S505.

As described above, the read and write operation for the reference area M3 is desirably performed using an interface (I/F) of the OS 300. That is, processing for the reference area M3 is generally performed by the OS 300 using a function such as an application programming interface (API) function. The use of the I/F facilitates processing such as writing and reading.

Sixth Embodiment

A sixth embodiment is different from the first embodiment in data configuration, functional configuration, and overall process. Hereinafter, the differences will be mainly described, and redundant description is omitted. The same components as those in the first embodiment are denoted by the same numerals and will not be described.

Example Data Configuration and Application Configuration

Figure 19:
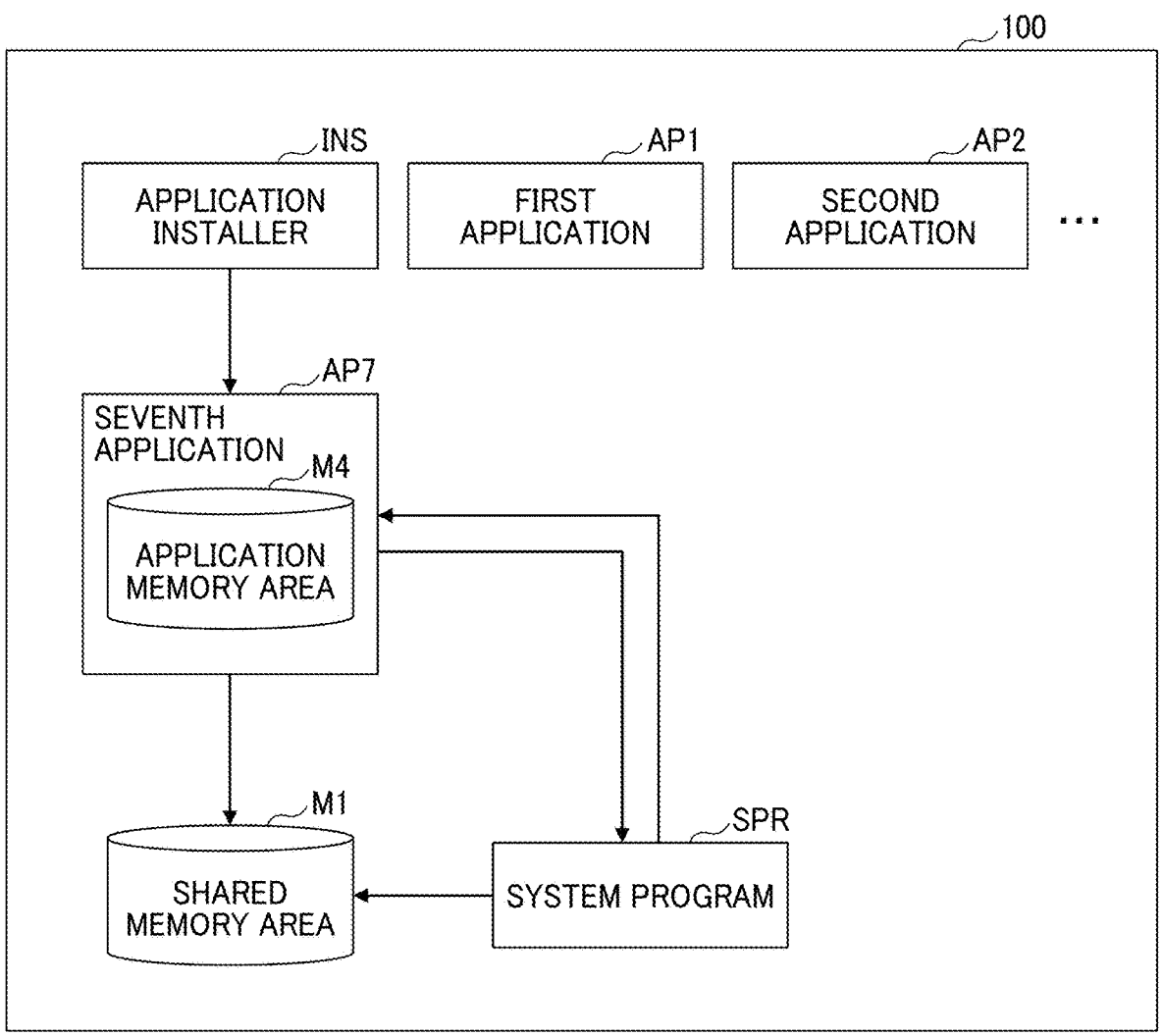
FIG. 19 is a block diagram illustrating an example data configuration and application configuration according to a sixth embodiment.

FIG. 19 is a block diagram illustrating an example data configuration and application configuration according to the sixth embodiment. In the sixth embodiment, unlike the first embodiment, the storage destinations of set values are the shared memory area M1 and a memory area (hereinafter referred to as "application memory area M4") separate from the shared memory area M1. In the sixth embodiment, furthermore, an application added by the application installer INS is represented by a seventh application AP7.

Figure 20:
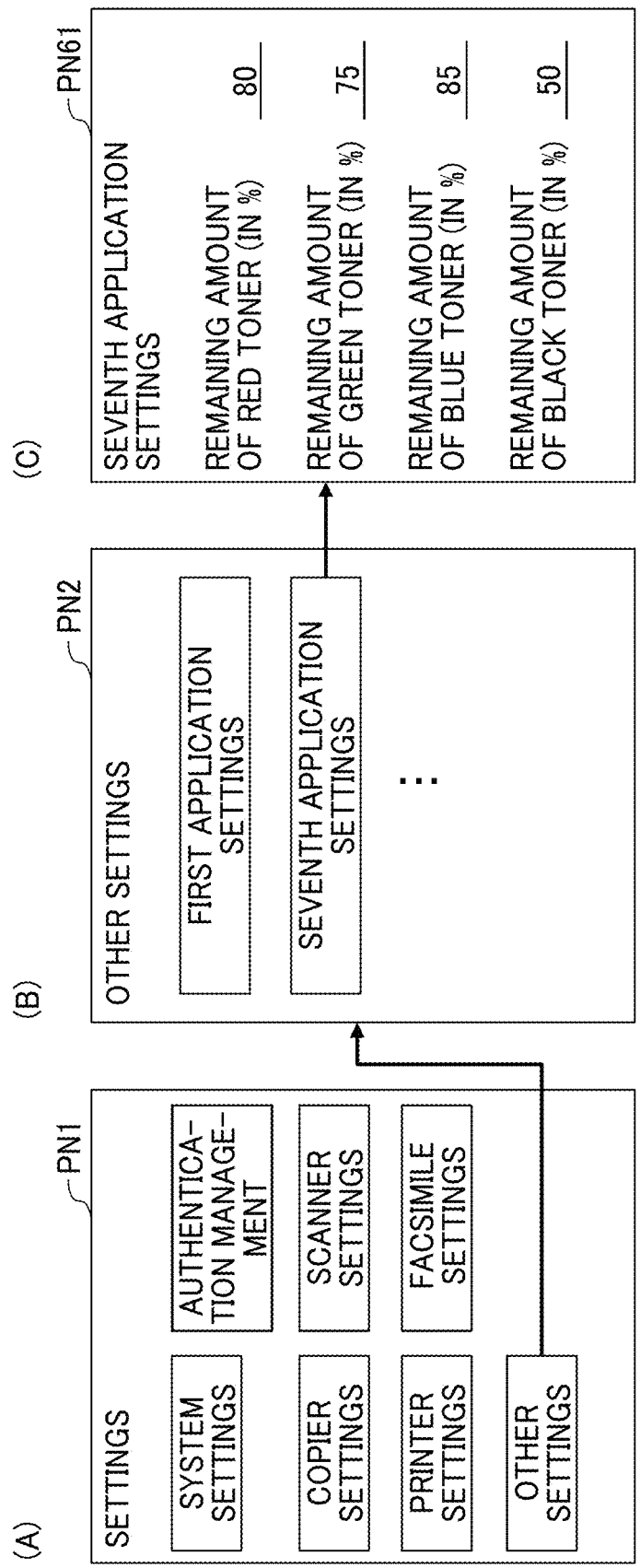
FIG. 20 illustrates an example transition of setting screens according to the sixth embodiment.

As illustrated in FIG. 19, the image forming apparatus 100 has the shared memory area M1, which is sharable by applications, the system program SPR, and so on. For example, set values provided in Table 7 below are stored in the shared memory area M1.

first setting screen PN1, then, as illustrated in a screen (B) of FIG. 20, as in the screen (B) of FIG. 6, the setting screen transitions to the second setting screen PN2.

When the "seventh application settings" button is pressed on the second setting screen PN2, as illustrated in the screen (C) of FIG. 20, the setting screen transitions to a setting screen for the seventh application AP7 (hereinafter referred to as "seventh application settings screen PN61").

As illustrated in the screen (C) of FIG. 20, on the seventh application settings screen PN61, the set values for the IDs "G001", "G002", "G003", and "G004" are displayed as the "remaining amount of red toner", the "remaining amount of green toner", the "remaining amount of blue toner", and the "remaining amount of black toner", respectively.

Example Overall Process

Figure 21:
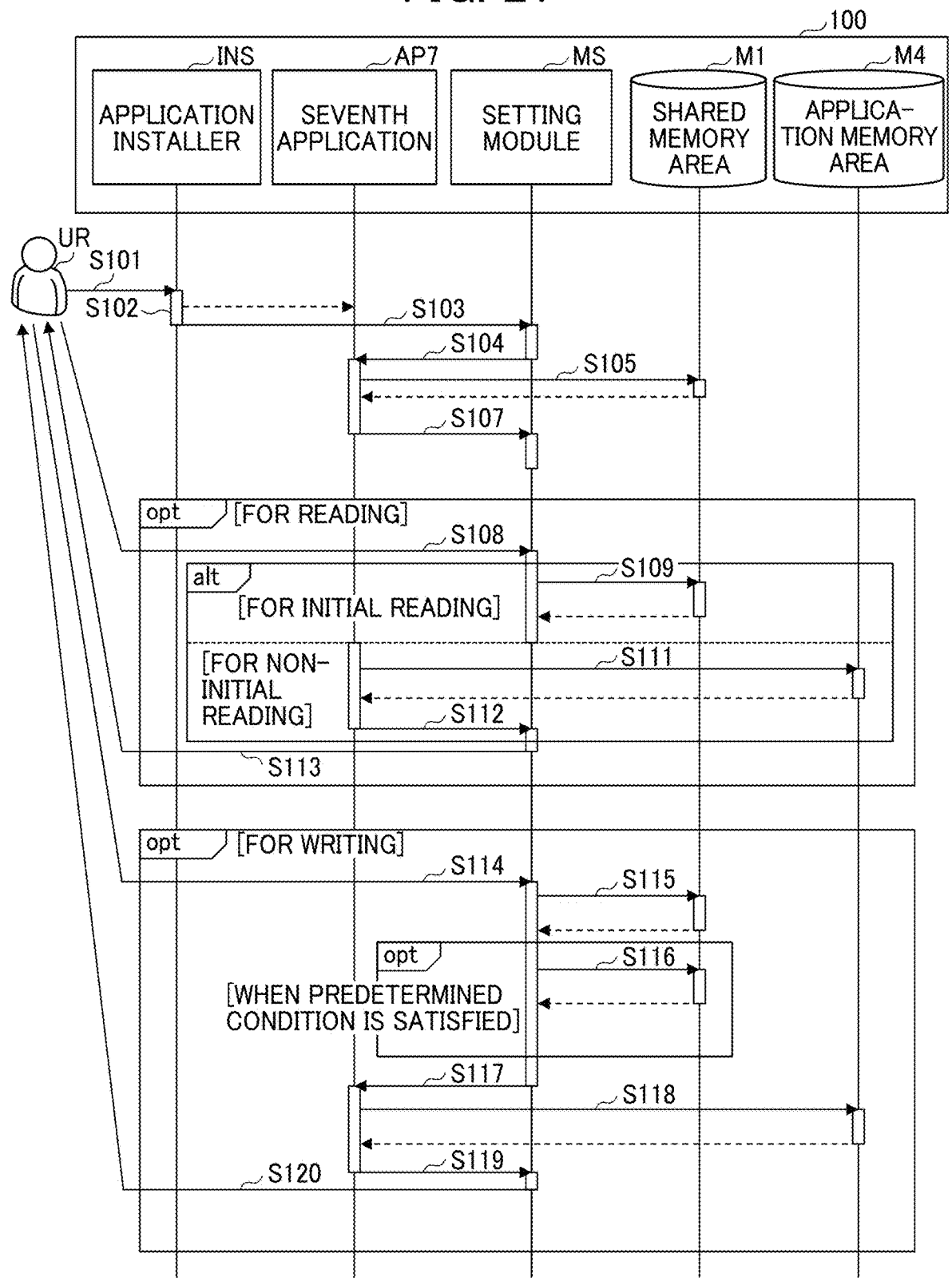
FIG. 21 is a sequence diagram illustrating an example overall process according to the sixth embodiment.

FIG. 21 is a sequence diagram illustrating an example overall process according to the sixth embodiment. In the sixth embodiment, unlike the first embodiment, all of the set values are written to the shared memory area M1 during initialization (step S105).

In the sixth embodiment, furthermore, in the read operation ("FOR READING"), during the initial reading session ("FOR INITIAL READING"), for example, immediately after power is turned on such that no set value is stored in

TABLE 7

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| . | . | . | . | . | . | . | . | . | . |
| Seventh Application | G001 | Indicated by Numerical Value | 0 to 100 | Remaining Amount of Red Toner (in %) | — | Other Settings > Seventh Application Settings | Set Value | Set Value | ... |
| Seventh Application | G002 | Indicated by Numerical Value | 0 to 100 | Remaining Amount of Green Toner (in %) | — | Other Settings > Seventh Application Settings | Set Value | Set Value | ... |
| Seventh Application | G003 | Indicated by Numerical Value | 0 to 100 | Remaining Amount of Blue Toner (in %) | — | Other Settings > Seventh Application Settings | Set Value | Set Value | ... |
| Seventh Application | G004 | Indicated by Numerical Value | 0 to 100 | Remaining Amount of Black Toner (in %) | — | Other Settings > Seventh Application Settings | Set Value | Set Value | ... |
| . | . | . | . | . | . | . | . | . | . |
| . | . | . | . | . | . | . | . | . | . |

Unlike Table 1 above, Table 7 above contains set values for the IDs "G001", "G002", "G003", and "G004".

The set values for the IDs "G001", "G002", "G003", and "G004" are examples of a set value that changes frequently. Specifically, the set value for the ID "G001" indicates the remaining amount of red toner. The set value for the ID "G002" indicates the remaining amount of green toner. The set value for the ID "G003" indicates the remaining amount of blue toner. The set value for the ID "G004" indicates the remaining amount of black toner. These set values change each time printing is performed. For example, these set values are displayed on a setting screen, for example, in the following way.

FIG. 20 illustrates an example transition of setting screens according to the sixth embodiment. For example, first, as illustrated in a screen (A) of FIG. 20, as in the screen (A) of FIG. 6, when the "other settings" button is pressed on the the application memory area M4, a set value is read from the shared memory area M1 (step S109). During a non-initial reading session ("FOR NON-INITIAL READING"), a set value is read from the application memory area M4 (step S111).

In the sixth embodiment, furthermore, in the write operation ("FOR WRITING"), a set value is written to the shared memory area M1 in step S116 when a predetermined condition is satisfied.

The predetermined condition is determined by, for example, the number of write operations, the time period, the timing of termination, the number of updates, or a combination thereof. The predetermined condition is set in advance.

For example, the number of write operations is used as a condition. In this case, when a set value is written to the application memory area M4 100 times (the reference value is set in advance), the image forming apparatus 100 writes a set value in the shared memory area M1 once. That is, a set value is written to the shared memory area M1 once for every 100 times a set value is written to the application memory area M4.

Likewise, when the number of updates is reached, that is, when a set value is updated a predetermined number of times, the image forming apparatus 100 writes a set value to the shared memory area M1. The image forming apparatus 100 writes a set value to the application memory area M4 until the number of updates is reached.

In a case where the time period is used as a condition, the image forming apparatus 100 writes a set value to the shared memory area M1 after a predetermined time period has elapsed since the previous writing to the shared memory area M1. The image forming apparatus 100 writes a set value to the application memory area M4 until the predetermined time period has elapsed.

At the timing of termination (such as when power is turned off), the image forming apparatus 100 may write a set value to the shared memory area M1, and may write a set value to the application memory area M4 at the other timings, for example.

That is, the image forming apparatus 100 does not write a set value to the shared memory area M1 each time the set value changes, but writes a set value to the shared memory area M1 at an interval of a certain period. Accordingly, the number of times a set value is written to the shared memory area M1 is reduced.

Example Functional Configuration

Figure 22:
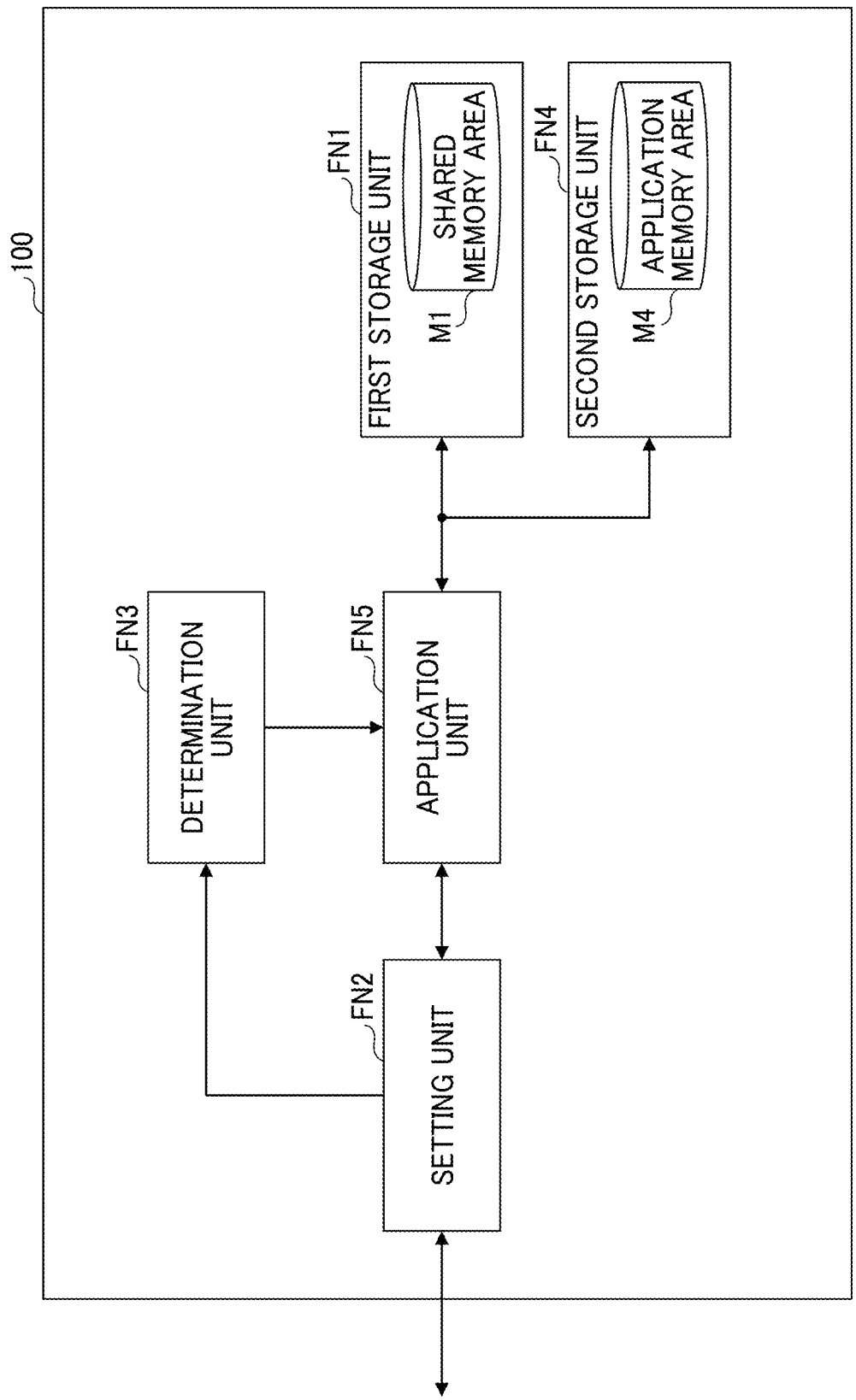
FIG. 22 is a block diagram illustrating an example functional configuration of an image forming apparatus according to the sixth embodiment.

FIG. 22 is a functional block diagram illustrating an example functional configuration of an image forming apparatus 100 according to the sixth embodiment. In the sixth embodiment, unlike the first embodiment, the memory area formed by the second storage unit FN4 is the application memory area M4.

The determination unit FN3 performs a determination procedure for determining whether a predetermined condition is satisfied.

For example, if the first storage unit FN1 is a non-volatile memory, the number of write operations is generally limited. That is, if the first storage unit FN1 is a non-volatile memory, frequent writing to the first storage unit FN1 may shorten hardware life. To address this situation, a memory area implemented by a volatile memory, such as the second storage unit FN4, is ensured. In a case where frequent changes occur, writing of set values to the second storage unit FN4 reduces the frequency of writing to the first storage unit FN1.

Accordingly, the second storage unit FN4 is desirably implemented by hardware having an unlimited number of write operations or a large number of write operations that can be performed, such as a volatile memory or an HDD. This configuration can extend the hardware life of the image forming apparatus 100.

The set values that change frequently are not limited to remaining amounts of toner. For example, a set value that changes frequently may be a value measured by a sensor or the like.

Seventh Embodiment

A seventh embodiment is different from the sixth embodiment in data configuration and overall process. Hereinafter, the differences will be mainly described, and redundant description is omitted. The same components as those in the sixth embodiment are denoted by the same numerals and will not be described.

Example Data Configuration and Application Configuration

Figure 23:
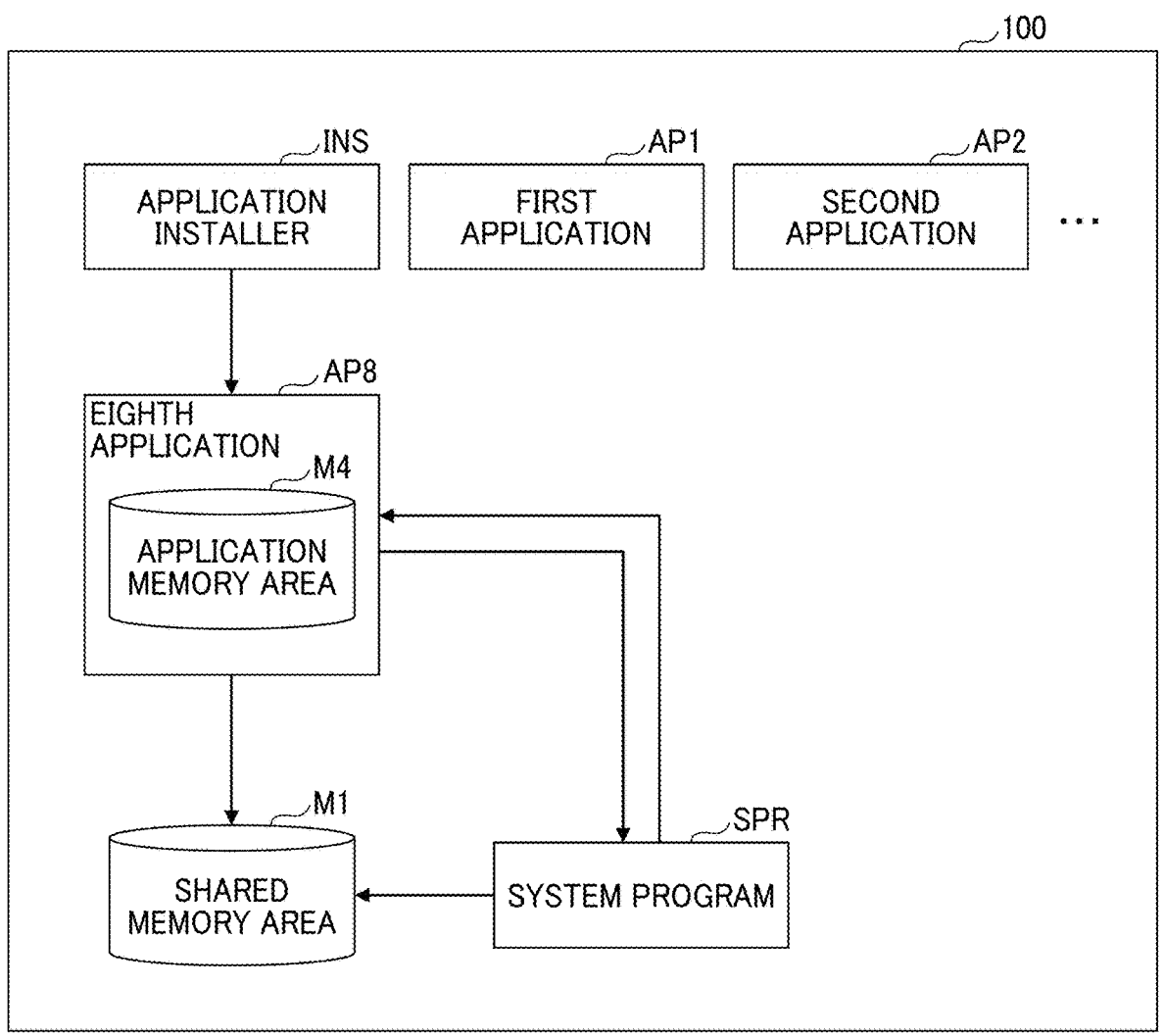
FIG. 23 is a block diagram illustrating an example data configuration and application configuration according to a seventh embodiment.

FIG. 23 is a block diagram illustrating an example data configuration and application configuration according to the seventh embodiment. In the seventh embodiment, unlike the sixth embodiment, an application added by the application installer INS is represented by an eighth application AP8.

As illustrated in FIG. 23, the image forming apparatus 100 has the shared memory area M1, which is sharable by applications, the system program SPR, and so on. For example, set values provided in Table 8 below are stored in the shared memory area M1.

TABLE 8

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| . | . | . | . | . | . | . | . | . | . |
| Eighth Application | H001 | Multiple-Choice | — | Priority Start Function | HOME | Other Settings > Eighth Application Settings | Input Range | — | ... |
| . | . | . | . | . | . | . | . | . | . |
| . | . | . | . | . | . | . | . | . | . |
| . | . | . | . | . | . | . | . | . | . |

The image forming apparatus 100 writes a set value to the second storage unit FN4. If it is determined that the predetermined condition is satisfied, the image forming apparatus 100 writes a set value to the first storage unit FN1. This configuration can reduce the frequency of writing to the first storage unit FN1.

Unlike Table 7 above, Table 8 above contains a set value for the ID "H001".

The set value for the "input range" associated with the ID "H001" is an example of a set value that changes frequently (hereinafter referred to as "frequently changing set value"). Specifically, a value obtained from a peripheral or the like is entered in the "input range" associated with the ID "H001". That is, a set value changed depending on the peripheral or the like is entered in the "input range" associated with the ID "H001", and a read request is made to the application memory area M4 to inquire the value. In the illustrated example, the eighth application AP8 obtains a set value in response to the inquiry request.

Such a set value typically changes each time the set value is obtained. Writing such a set value to the first storage unit FN1 each time the set value is obtained may shorten the hardware life of the first storage unit FN1, which is implemented by a memory device having a limited number of write operations. Accordingly, the frequently changing set value is desirably written to the application memory area M4.

Example Overall Process

FIG. 24 is a sequence diagram illustrating an example overall process according to the seventh embodiment. In the seventh embodiment, unlike the first embodiment, during A set value that is frequently updated, such as a frequently changing set value, is desirably written and read by using hardware having an unlimited number of write operations or a large number of write operations that can be performed, such as a volatile memory or an HDD. This configuration can extend the hardware life of the image forming apparatus 100.

Variations

For the shared memory area M1, a storage destination may be entered in the "read request" and the "write request". That is, a path or the like to the storage destination may be entered in the "read request" and the "write request".

Comparative Example

In a comparative example, as provided in Table 9 below, for example, all of the pieces of information, including sensitive information such as a "password", are stored in the shared memory area M1.

TABLE 9

| Setting Owner | ID | Set Value Type | Input Range | Title | Set Value | Location | Read Request | Write Request | ... |
|---|---|---|---|---|---|---|---|---|---|
| First Application | A001 | Numerical Value | 0 to 10 | Number of Retries | 3 | Other Settings > First Application Settings | — | — | ... |
| First Application | A002 | Numerical Value | 10 to 1000 | Interval of Retries | 100 | Other Settings > First Application Settings | — | — | ... |
| Second Application | B001 | Character String | 0 to 100 Characters | Information from Administrator | "Device Is Not Available Every Sunday" | System Settings > Administrator Settings | — | — | ... |
| . | . | . | . | . | . | . | . | . | . |
| . | . | . | . | . | . | . | . | . | . |
| . | . | . | . | . | . | . | . | . | . |
| Fifth Application | E001 | Character String | 8 to 255 Characters | Password | 3xsw2cde3 | Other Settings > Fifth Application Settings | Set Value | Set Value | ... |
| Fifth Application | E002 | Multiple-Choice | Full-Color Monochrome, Grayscale | Default Color Mode | Full-Color | Other Settings > Fifth Application Settings | — | — | ... |
| Fifth Application | E003 | Multiple-Choice | ON, OFF | Fifth-Application Energy-Saving Priority Settings | ON | Other Settings > Fifth Application Settings, System Settings > Energy-Saving Settings | — | — | ... |
| . | . | . | . | . | . | . | . | . | . |
| . | . | . | . | . | . | . | . | . | . |
| . | . | . | . | . | . | . | . | . | . | initialization, if a set value is determined to be a frequently changing set value ("WHEN SET VALUE IS FREQUENTLY CHANGING SET VALUE"), the set value is written to the application memory area M4 (step S106).

In the read operation ("FOR READING"), a frequently changing set value ("WHEN SET VALUE IS FREQUENTLY CHANGING SET VALUE") is read from the application memory area M4 (step S111). A set value other than a frequently changing set value ("WHEN SET VALUE IS NOT FREQUENTLY CHANGING SET VALUE") is read from the shared memory area M1 (step S109).

Likewise, in the write operation, that is, when a set value is obtained ("FOR WRITING"), a frequently changing set value ("WHEN SET VALUE IS FREQUENTLY CHANGING SET VALUE") is written to the application memory area M4 when obtained (step S118). A set value other than a frequently changing set value ("WHEN SET VALUE IS NOT FREQUENTLY CHANGING SET VALUE") is written to the shared memory area M1 (step S116).

In the stored data as provided in Table 9 above, the password (whose information is stored in plaintext) is accessible through various applications by obtaining the value representing the "password". This may cause information leakage due to the value representing the "password".

OTHER EMBODIMENTS

All or some of the processes according to embodiments of the present disclosure may be implemented by a program written in a low-level language or a high-level language for causing a computer to perform an information processing method. That is, the program is a computer program for causing a computer of an image forming apparatus, an image forming system, or the like to execute each process.

Accordingly, when the information processing method is performed in accordance with the program, a computation device and a control device included in the computer perform computation and control in accordance with the program to execute each process. A memory device included in the computer stores data to be used for each process in accordance with the program to execute the process.

The program can be recorded in and distributed from a computer-readable recording medium. The recording medium is a medium such as a magnetic tape, a flash memory, an optical disk, a magneto-optical disk, or a magnetic disk. The program may also be distributed via a telecommunication line.

The embodiments of the present disclosure may be implemented by an image forming system. The image forming system may be implemented by executing the processes in a redundant, distributed, parallel, or virtualized manner or a combination thereof.

In the method of the related art, however, set values used for applications, an operating system (OS), and so on are each typically stored in a specified memory area (hereinafter referred to as "storage destination"). Therefore, it may be difficult to store the set values in the desired memory areas for various purposes or applications.

According to one or more embodiments of the present disclosure, a set value is stored in a desired memory area.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image forming apparatus including an operation device coupled to the image forming apparatus and configured to accept an operation to the image forming apparatus, the image forming apparatus comprising:
a memory including a first memory area configured to,
store an association between a set value, a setting, an owner of the setting, a read request, and a write request, and
store the set value, the set value corresponding to a value of a setting for an application that is installed on the image forming apparatus; and
circuitry configured to,
accept an operation of writing or reading the set value,
determine a type of a process to be performed on the set value based on the association, and
based on the determination,
encrypt the set value and store the encrypted set value in the first memory area of the memory,
write the set value to a second memory area in the memory, or
read the set value from the second memory area.

2. The image forming apparatus according to claim 1, wherein the circuitry is further configured to:
determine the second memory area as a storage destination for the set value; and
write the set value to the second memory area and read the set value from the second memory area,
wherein the second memory area is a secure memory area.

3. The image forming apparatus according to claim 1, wherein the circuitry is further configured to:
determine whether to encrypt the set value;
write the encrypted set value obtained by encrypting the set value to the first memory area; and
read the encrypted set value from the first memory area and decrypt the encrypted set value.

4. The image forming apparatus according to claim 1, wherein the circuitry is further configured to:
determine the second memory area as a storage destination for the set value; and
write the set value to the second memory area and read the set value from the second memory area,
wherein the second memory area is a reference memory area to be referred to by an operating system.

5. The image forming apparatus according to claim 4, wherein the circuitry is further configured to perform a process of writing the set value or reading the set value via the operating system.

6. The image forming apparatus according to claim 1, wherein the first memory area is a memory area having a limited number of write operations, and
wherein the circuitry is further configured to:
write the set value to the second memory area; and
write the set value to the first memory area in response to a condition being satisfied.

7. The image forming apparatus according to claim 1, wherein the first memory area is a memory area sharable by an operating system or a plurality of applications.

8. An information processing method performed by an image forming apparatus including an operation device coupled to the image forming apparatus and configured to accept an operation to the image forming apparatus, the information processing method comprising:
storing in a first memory area in a memory a set value corresponding to a value of a setting for an application that is installed to the image forming apparatus;
accepting an operation of writing or reading the set value;
determining a type of a process to perform on the set value based on an association stored in the first memory, the association associating a setting, an owner of the setting, a read request, a write request, and the set value; and
based on the determination,
encrypting the set value and storing the encrypted set value in the first memory area,
writing the set value to a second memory area in the memory, or
reading the set value from the second memory area.

9. A non-transitory computer-readable medium storing a program for causing a computer to carry out the information processing method of claim 8.

10. The image forming apparatus according to claim 1, wherein the memory includes a table storing the association between the set value and the setting.

11. The image forming apparatus according to claim 3, wherein the circuitry is further configured to determine whether to encrypt the set value based on the setting.

12. The image forming apparatus according to claim 1, wherein the circuitry is further configured to:
install a new application to the image forming apparatus by
determining a type of a process to be performed on a new set value based on an association between the new set value and the application setting, and
based on the determination, encrypt the new set value and store the encrypted new set value in the first memory area of the memory, or
write the new set value to the second memory area in the memory.

\* \* \* \* \*